United States Patent
Pham et al.

(10) Patent No.: US 10,289,884 B2
(45) Date of Patent: May 14, 2019

(54) IMAGE ANALYZER, IMAGE ANALYSIS METHOD, COMPUTER PROGRAM PRODUCT, AND IMAGE ANALYSIS SYSTEM

(71) Applicant: KABUSHIKI KAISHA TOSHIBA, Tokyo (JP)

(72) Inventors: Quoc Viet Pham, Kanagawa (JP); Tomoki Watanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 6 days.

(21) Appl. No.: 15/247,054

(22) Filed: Aug. 25, 2016

(65) Prior Publication Data

US 2017/0061644 A1 Mar. 2, 2017

(30) Foreign Application Priority Data

Aug. 27, 2015 (JP) .................................. 2015-167854
Mar. 22, 2016 (JP) .................................. 2016-056976

(51) Int. Cl.
*G06K 9/00* (2006.01)
*G06T 7/269* (2017.01)
*G06T 7/277* (2017.01)

(52) U.S. Cl.
CPC ................ *G06K 9/00* (2013.01); *G06T 7/269* (2017.01); *G06T 7/277* (2017.01);
(Continued)

(58) Field of Classification Search
CPC . G06T 2207/10016; G06T 2207/20072; G06T 2207/20076; G06T 2207/30196;
(Continued)

(56) References Cited

U.S. PATENT DOCUMENTS 8,472,715 B2 6/2013 Yokomitsu et al.
2010/0322516 A1* 12/2010 Xu .................... G06K 9/00778
382/173
(Continued)

FOREIGN PATENT DOCUMENTS

JP 2009-110152 5/2009
JP 2010-277547 12/2010
(Continued)

OTHER PUBLICATIONS

Lucas, Bruce, D., "An Iterative Image Registration Technique with an Application to Stereo Vision", Proc. 7$^{th}$ Intl. Joint Conf. on Artificial Intelligence (IJCAI), Aug. 24-28, 1981, Vancouver, British Columbia, pp. 674-679.
(Continued)

*Primary Examiner* — Bhavesh M Mehta
*Assistant Examiner* — Ian L Lemieux
(74) *Attorney, Agent, or Firm* — Finnegan, Henderson, Farabow, Garrett & Dunner, L.L.P.

(57) ABSTRACT

According to an embodiment, an image analyzer includes a set unit, a first calculator, a second calculator, a divider, a third calculator, and a specifier. The set unit sets multiple partial regions in the image. The first calculator calculates an optical flow in a partial region. The second calculator calculates the density of an object included in the partial region. The divider divides the image into the multiple blocks. The third calculator calculates, for a block, a statistical amount that is derived from the density and the moving amount of the object derived from the optical flow for the partial region included in the block. The specifier specifies the block, out of the blocks, as an unsteady block that is in an unsteady state on the basis of the statistical amount.

14 Claims, 23 Drawing Sheets

(52) U.S. Cl.
CPC ............... *G06T 2207/10016* (2013.01); *G06T 2207/20072* (2013.01); *G06T 2207/20076* (2013.01); *G06T 2207/30196* (2013.01); *G06T 2207/30232* (2013.01)

(58) Field of Classification Search
CPC ........... G06T 2207/30232; G06T 7/269; G06T 7/277
See application file for complete search history.

(56) References Cited

U.S. PATENT DOCUMENTS

| | | |
|---|---|---|
| 2013/0113934 A1 | 5/2013 | Hotta et al. |
| 2014/0226855 A1* | 8/2014 | Savvides ............ G06K 9/00771 382/103 |
| 2015/0242709 A1 | 8/2015 | Pham |

FOREIGN PATENT DOCUMENTS

| | | |
|---|---|---|
| JP | 2012-22370 | 2/2012 |
| JP | 2013-127716 | 6/2013 |
| JP | 2015-158712 | 9/2015 |

OTHER PUBLICATIONS

Kimura et al., "Congestion, stay detection sensor based on the three-dimensional action measurement of the crowd," Meeting on Image Recognition and Understanding (MIRU) 2011, IS2-10, pp. 566-571 (2011).

\* cited by examiner

IMAGE ANALYZER, IMAGE ANALYSIS METHOD, COMPUTER PROGRAM PRODUCT, AND IMAGE ANALYSIS SYSTEM

CROSS-REFERENCE TO RELATED APPLICATIONS

This application is based upon and claims the benefit of priority from Japanese Patent Application No. 2015-167854, filed on Aug. 27, 2015, and Japanese Patent Application No. 2016-056976, filed on Mar. 22, 2016; the entire contents of which are incorporated herein by reference.

FIELD

Embodiments described herein relate generally to an image analyzer, an image analysis method, a computer program product, and an image analysis system.

BACKGROUND

Systems have been known that detect unsteady states from images. For example, Japanese Patent Application Laid-open No. 2012-22370 discloses that an unsteady state is specified from an attribute of optical flows in an image. Japanese Patent Application Laid-open No. 2012-22370 specifies that a reverse movement against a flow of a main stream, an abnormal speed state in which a movement with a different speed from those of the other movements is present, and a state in which a turbulence occurs in a flow are the unsteady states.

Such a conventional technique, however, has a limit on types of unsteady states capable of being specified.

DETAILED DESCRIPTION

According to an embodiment, an image analyzer includes processing circuitry configured to set multiple partial regions in an image; calculate an optical flow in a partial region; calculate a density of an object included in the partial region; divide the image into multiple blocks; and calculate, for a block, a statistical amount that is derived from the density and a moving amount of the object for the partial region included in the block. The moving amount is derived from the optical flow. The processing circuitry specifies, out of the blocks, an unsteady block that is in an unsteady state on the basis of the statistical amount.

First Embodiment

Figure 1:
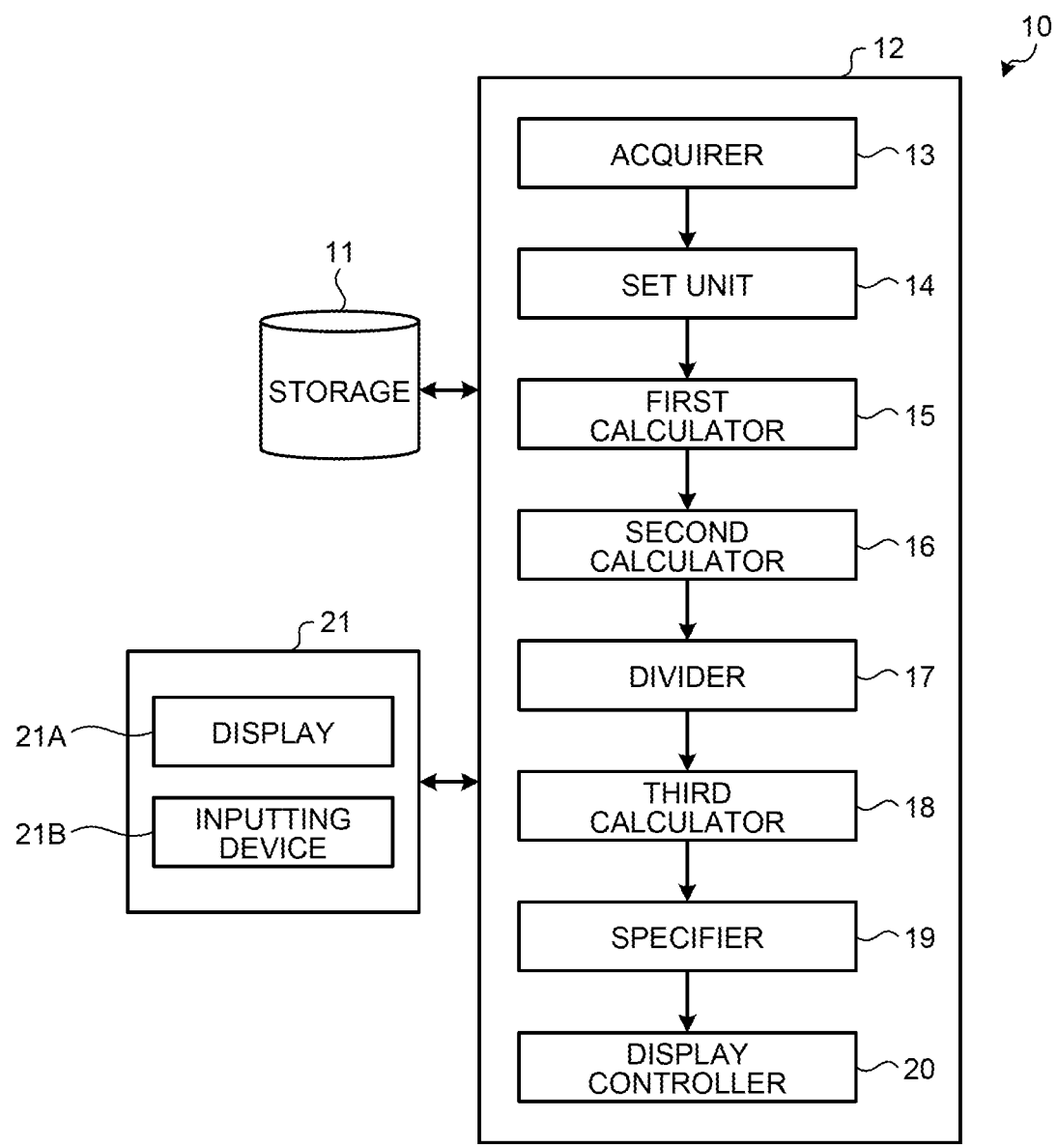
FIG. 1 is a block diagram illustrating an image analysis system according to a first embodiment.

FIG. 1 is a block diagram illustrating an image analysis system 10 according to a first embodiment. The image analysis system 10 includes an image analyzer 12, storage 11, and a user interface (UI) unit 21. The storage 11 and the UI unit 21 are electrically connected to the image analyzer 12.

The UI unit 21 includes a display 21A and an inputting device 21B. The display 21A is used to display various images. Examples of the display 21A include a cathode-ray tube (CRT) display, a liquid crystal display, an organic electroluminescence (EL) display, and a plasma display. The inputting device 21B receives various instructions and information input from the user. Examples of the inputting device 21B include a keyboard, a mouse, a switch, and a microphone.

The UI unit 21 may be a touch panel in which the display 21A and the inputting device 21B are integrated.

The storage 11 stores therein a variety of data. In the first embodiment, the storage 11 stores therein an image to be analyzed. The storage 11 can be implemented using storage device such as a hard disk drive (HDD), a solid state drive (SSD), a read only memory (ROM), or a memory card in which information can be stored in a magnetic, optical, or electrical manner.

The image analyzer 12 analyzes an image and specifies a region in an unsteady state, which is described in detail later. The image analyzed by the image analyzer 12 includes one or more objects. The object may be any object capable of being subjected to the image analysis. In the first embodiment, the object is a person, as an example. The object is, however, not limited to the person. Examples of the object include vehicles and cells.

The image analyzer 12 is a computer that may include a central processing unit (CPU), a read only memory (ROM), and a random access memory (RAM), for example. The image analyzer 12 may be a circuit other than the CPU.

The image analyzer 12 controls the whole of the image analysis system 10. The image analyzer 12 includes an acquirer 13, a set unit 14, a first calculator 15, a second calculator 16, a divider 17, a third calculator 18, a specifier 19, and a display controller 20.

Herein, some or all of the acquirer 13, the first calculator 15, the second calculator 16, the divider 17, the third calculator 18, the specifier 19, and the display controller 20 can be implemented by making a processor such as a CPU execute computer programs, that is, can be implemented using software; or can be implemented using hardware such as an integrated circuit (IC); or can be implemented using a combination of software and hardware.

The acquirer 13 obtains images to be analyzed. In the first embodiment, the acquirer 13 obtains the images from the storage 11. Alternatively, the acquirer 13 can obtain the images from an external device (not illustrated) or a known photographing device (not illustrated).

In the present embodiment, the acquirer 13 acquires multiple images taken in time series, as an example.

Figure 2:
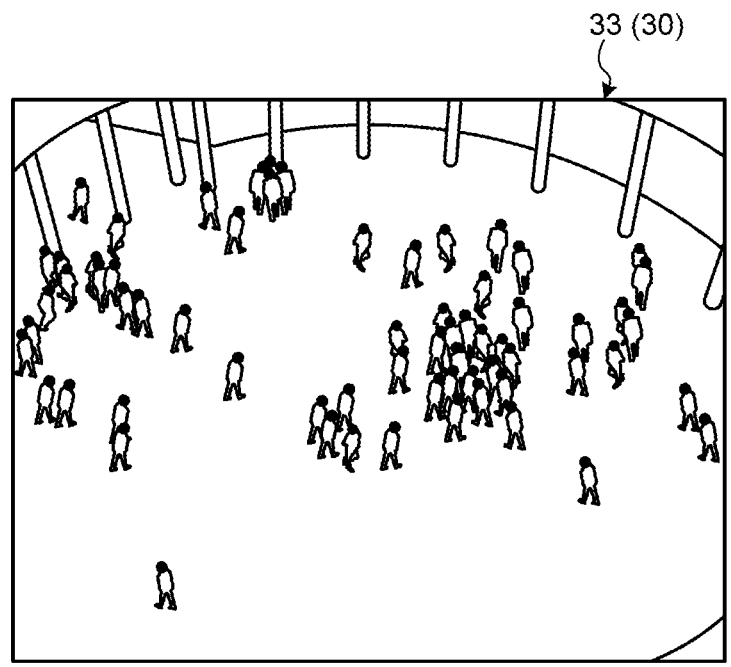
FIG. 2 is a schematic diagram illustrating an example of an image to be analyzed.

FIG. 2 is a schematic diagram illustrating an example of an image 33 that is the analysis target. The image 33 includes objects 30. As described above, the objects 30 are persons, in the present embodiment.

Referring back to FIG. 1, the set unit 14 sets multiple partial regions in the image 33.

The partial region, which is a part of the image 33, includes at least one object 30. In the present embodiment, the partial region is the image that is set in a part of the image 33 and has a rectangular shape.

Figure 3:
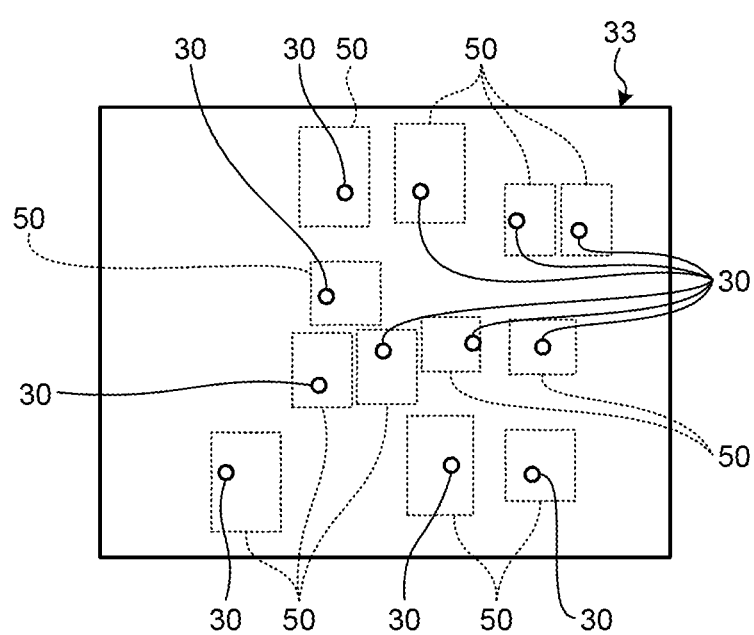
FIG. 3 is an explanatory view of a partial region.

FIG. 3 is an explanatory view of an example of partial regions 50. The set unit 14 sets multiple partial regions 50 by moving the rectangular region used for setting the target in the image 33.

In the example illustrated in FIG. 3, the set unit 14 sets the partial regions 50 such that a single object 30 is included in each partial region 50. The partial region 50 may include two or more objects 30.

The shape of the partial region 50 is not limited to the rectangular shape. Any shape may be applicable. The partial regions 50 set in the image 33 may have the same size and shape or different sizes and shapes from one another. For example, each partial region 50 may have the size in accordance with the shape and size of the region occupied by the object 30 included in the partial region 50.

At least a part of the partial regions 50 set in the image 33 may overlap with one another. The number of partial regions 50 set by the set unit 14 in the image 33 may be equal to or larger than two, and not limited to any specific number.

The set unit 14 may prepare a rectangular frame having a predetermined shape and size, and set the partial region 50 having a shape and a size according to the frame in the image 33. The set unit 14 may identify some objects 30 included in the image 33, and set the partial region 50 such that the partial region 50 includes the identified objects 30. The position, size, and shape of each partial region 50 set by the set unit 14 may be changed by the user's operation using the inputting device 21B.

In the present embodiment, the set unit 14 sets the multiple partial regions 50 for each of the multiple images (including the image 33) taken in time series.

Referring back to FIG. 1, the first calculator 15 calculates optical flows in the partial regions 50. The first calculator 15 calculates the optical flow for each of the respective partial regions 50 set by the set unit 14.

The optical flow represents the movement of the object 30 in the image using a vector. The optical flow represents a moving amount and a moving direction of the object 30.

In the present embodiment, the first calculator 15 associates the object 30 in the image 33 serving as the analysis target with the object 30 in the images taken before the image 33 is taken for each of the corresponding partial regions 50. The images taken before the image 33 is taken are preferably the images that are taken just before the image 33 is taken in the images continuing in time series.

The first calculator 15 calculates the optical flow of the object 30 included in the partial region 50 for each of the partial regions 50 in the image 33.

The first calculator 15 calculates the optical flows using a known method. The first calculator 15 calculates the optical flows in the respective regions 50 using a Lucas-Kanade method, for example.

The Lucas-Kanade method is described specifically in the following document: B. D. Lucas and T. Kanade, "An Iterative Image Registration Technique with an Application to Stereo Vision," in Proc. of Int. Joint conf. on Artificial Intelligence, pp. 674 to 667.

Figure 4A:
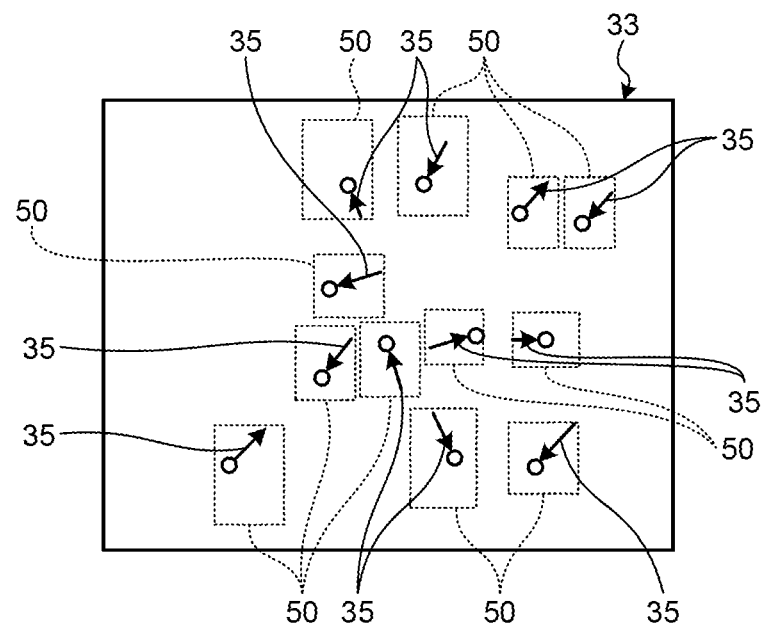
FIGS. 4A and 4B are explanatory views of optical flows and density calculation.
Figure 4B:
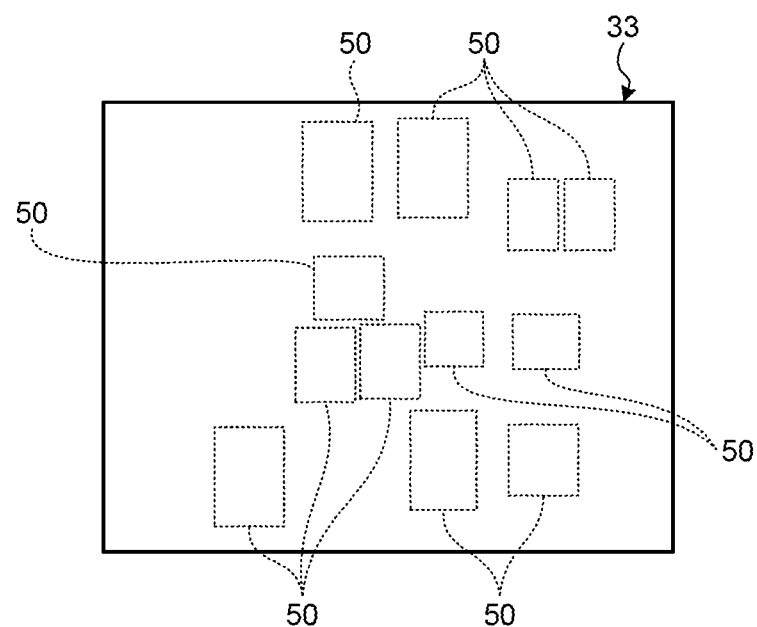

FIGS. 4A and 4B are explanatory views of the optical flows and density calculation. FIG. 4A is an explanatory view of optical flows 35. As illustrated in FIG. 4A, the first calculator 15 calculates the optical flow 35 for each of the partial regions 50.

The partial region 50 may include the multiple objects 30. In this case, the first calculator 15 calculates the optical flows of the respective objects 30 included in the partial region 50. The first calculator 15 calculates the optical flow 35 that is a vector having an average moving amount of the moving amounts represented by the calculated optical flows as the moving amount, and an average direction of vector directions represented by the calculated optical flows as the vector direction. The first calculator 15 uses the calculated optical flow 35 as the optical flow 35 in the partial region 50.

Referring back to FIG. 1, the second calculator 16 calculates the density of the object 30 included in the partial region 50 for each partial region 50. The second calculator 16 calculates the density of the object 30 for each of the partial regions 50 set in the image 33 serving as the analysis target.

The second calculator 16 may calculate the density of the object 30 included in each partial region 50 using a known method. It is preferable for calculating the density with high accuracy that the second calculator 16 calculates the density using a calculation method described in a second embodiment, which is described in detail later.

FIG. 4B is an explanatory view of the density calculation. The second calculator 16 calculates the density of the object 30 for each of the partial regions 50 included in the image 33, for example.

As a result, the optical flow 35 and the density are calculated by the first calculator 15 and the second calculator 16 for each of the partial regions 50 included in the image 33 (refer to FIGS. 4A and 4B).

Referring back to FIG. 1, the divider 17 divides the image 33 serving as the analysis target into multiple blocks. FIG.

5 is an explanatory view of the division of the image 33. The divider 17 divides the image 33 into multiple blocks P, for example.

Figure 5:
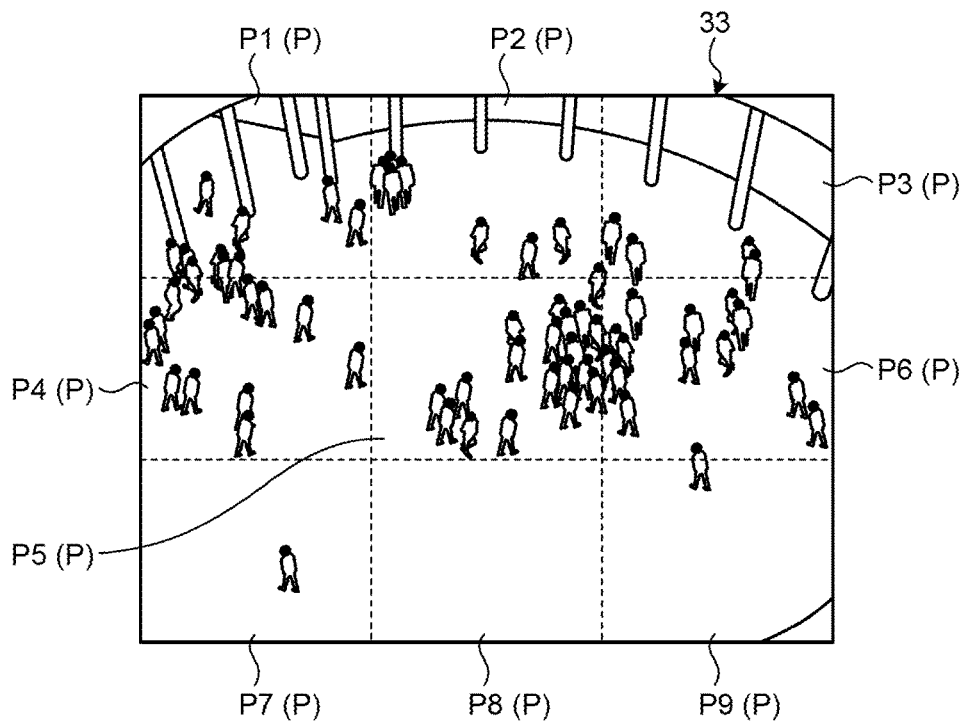
FIG. 5 is an explanatory view of division of the image.

FIG. 5 illustrates the state in which the divider 17 divides the image 33 into a matrix of 3×3 blocks P, i.e., nine blocks P of blocks P1 to P9. The divider 17 may divide the image 33 into multiple (equal to or larger than two) blocks P. The number of blocks P is not limited to nine.

Figure 6:
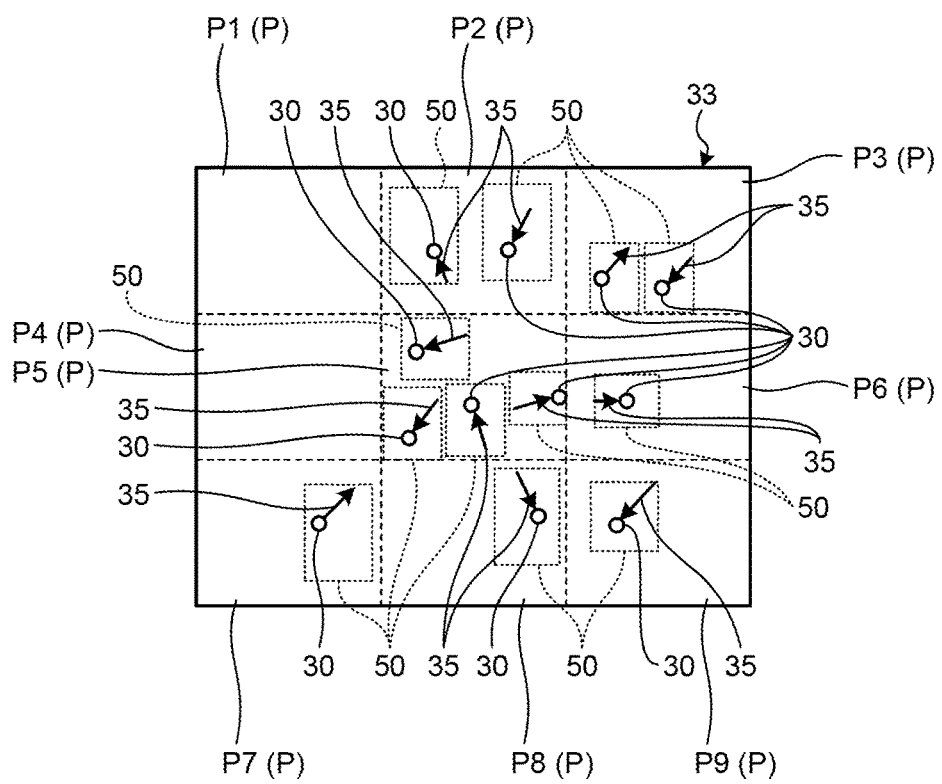
FIG. 6 is a schematic diagram illustrating an example of a corresponding relation between the partial regions and blocks.

The divider 17 preferably divides the image 33 such that at least one of the divided blocks P includes at least one partial region 50. FIG. 6 is a schematic diagram illustrating an example of a corresponding relation between the partial regions 50 and the blocks P (blocks P1 to P9). As illustrated in FIG. 6, the divider 17 preferably divides the image 33 such that at least one of the blocks P includes at least one partial region 50.

The multiple blocks P (blocks P1 to P9) may have the same shape and size or different shapes and sizes from one another. The divider 17 may divide the image 33 into the multiple blocks P such that each block P includes at least the partial regions 50 the number of which is equal to or larger than the predetermined number.

The shapes of multiple blocks may include alternative shapes such as a rectangle, a circle, and an ellipse. The sizes or the number of divisions of blocks P may be changed in accordance with an attribute of the image 33 serving as the analysis target. The attribute of the image 33 serving as the analysis target represents conditions when the image 33 is taken (e.g., place, season, day, time, the number of objects captured in a single image, and sizes of the objects). In this case, the acquirer 13 may acquire the image 33 to which the attribute is attached. The divider 17 may read the attribute attached to the image 33 serving as the analysis target, and divide the image 33 into the blocks P such that the sizes and the number of the blocks P correspond to the read attribute.

Referring back to FIG. 1, the third calculator 18 calculates a statistical amount for each of the blocks P. The statistical amount is a value, which is derived from the density of the object 30 and the moving amount of the object 30 derived from the optical flow 35 in the partial region 50 for each of the partial regions 50 included in the block P. In other words, the statistical amount is information that indicates a characteristic represented by the density and the moving amount of the object 30 in one or more partial regions 50 included in each block P.

The statistical amount is at least one of kinetic momentum of, kinetic energy of, an accumulation degree of, and potential energy of the object 30 included in the block P, for example. The statistical amount may be at least one of the kinetic momentum of, the kinetic energy of, the accumulation degree of, and the potential energy of the object 30 included in the block P, or a combination of two or more of them. In the following description, the object 30 may be simply described as the object by omitting the numeral.

The third calculator 18 calculates, as the statistical amount, one of or a combination of the kinetic momentum of, the kinetic energy of, the accumulation degree of, and the potential energy of the objects, which are calculated from one or more partial regions 50 included in the block P.

The third calculator 18 calculates, for each block P, the statistical amount using the densities and moving amounts of the objects in the partial regions 50 included in the block P. The moving amount of the object is derived from the optical flow 35. The vector length of the optical flow 35 is equivalent to the moving amount of the object.

The respective partial regions 50 are not always arranged in such a manner illustrated in FIG. 6, in which the respective partial regions 50 are included in any one of the blocks P. The partial region 50 is disposed in such a manner that the partial region 50 lies in both of the adjacent blocks P in some cases. In this case, the third calculator 18 uses a value obtained by distributing the calculated density and moving amount in the partial region 50, which is disposed by being laid in the multiple blocks P, in accordance with the area ratios of the respective regions overlapping with the blocks P to the corresponding blocks P.

For example, the density of the object is assumed to be "H" and the moving amount derived from the optical flow 35 of the object is assumed to be "R" in a certain partial region 50. The partial region 50 is assumed to be disposed by being laid in the multiple blocks P (e.g., in the blocks P1 and P2). One third of the area of the partial region 50 is assumed to be included in the block P1, while two thirds of the area of the partial region 50 are assumed to be included in the block P2.

In this case, the third calculator 18 may use, as the density of the object in the partial region 50 included in the block P1, the value obtained by multiplying the density "H" by one third. The third calculator 18 may use, as the moving amount in the partial region 50 included in the block P1, the value obtained by multiplying the moving amount "R" by one third.

Likewise, the third calculator 18 may use, as the density of the object in the partial region 50 included in the block P2, the value obtained by multiplying the density "H" by two thirds. The third calculator 18 may use, as the moving amount in the partial region 50 included in the block P2, the value obtained by multiplying the moving amount "R" by two thirds.

The specifier 19 specifies, out of the multiple blocks P (blocks P1 to P9), an unsteady block that is in an unsteady state on the basis of the statistical amount. As the unsteady block, the specifier 19 specifies that the block P in which the statistical amount calculated by the third calculator 18 is equal to or greater than a threshold. The threshold used for specification whether the block is in the unsteady state or a steady state may be preliminarily determined.

The unsteady state means the different state from the steady state. The unsteady state represents at least one of the following types of states: the presence or absence of congestion of, the presence or absence of accumulation of, and the presence or absence of aggregation of the objects included in the block P, for example.

The presence or absence of congestion of the objects represents the state in which a large number of objects move while being congested or a small number of objects move. A large number of objects means that the number of objects is equal to or larger than a predetermined threshold. A small number of objects means that the number of objects is smaller than the threshold. The threshold (the number of objects) may be preliminarily determined by adjustment.

The presence or absence of accumulation of the objects represents the state in which a large number of objects are accumulated or no objects are accumulated. The accumulation of a large number of objects means that the moving speeds of the large number of objects are equal to or smaller than a threshold. The threshold may be preliminarily determined.

The presence or absence of aggregation of the objects represents the state in which a large number of objects are aggregated or no objects are aggregated. The aggregation of the objects means that the distances among the objects are equal to or smaller than a predetermined threshold. The threshold may be preliminarily determined.

The following specifically describes the calculation of the statistical amount and the specification of the unsteady state.

The following describes a case in which the kinetic momentum of the objects is calculated as the statistical amount.

In this case, the third calculator 18 calculates, for each block P, as the kinetic momentum of the objects in the block P, the sum of the multiplication values obtained by multiplying the density of the object by the moving amount derived from the optical flow 35 in the partial region 50 for each of the partial regions 50 included in the block P.

Specifically, the third calculator 18 calculates a kinetic momentum M of the objects for each block P using Equation (1).

$$M = \sum_{i=1}^{n} m_i \times v_i \quad (1)$$

where M represents the kinetic momentum of the objects in the block P, i is an integer equal to or larger than one and equal to or smaller than n, $m_i$ represents the density of the object in the partial region 50 at a position i in the block P, and $v_i$ represents the moving amount (moving amount derived from the optical flow 35) in the partial region 50 at the position i in the block P. The position i is allocated to each of the partial regions 50 in the block P. The value of n in Equation (1) is, thus, equal to the number of regions 50 included in the block P.

The third calculator 18 calculates, for each partial region 50 in the block P, the multiplication value obtained by multiplying the moving amount derived from the optical flow 35 by the density of the object. The third calculator 18 calculates, as the kinetic momentum M of the objects, the sum (total value) of the respective multiplication values in the partial regions 50 included in the block P.

In this case, the specifier 19 specifies, to be the unsteady block, the block P in which the kinetic momentum M of the objects calculated by the third calculator 18 is equal to or larger than a first threshold out of the blocks P (blocks P1 to P9) in the image 33. The specifier 19 specifies, to be the unsteady block, the block P in which M 2 T1 is satisfied. T1 represents the first threshold.

The specifier 19 preliminarily stores, in the storage 11, the number of partial regions 50 included in the block P (i.e., the value of n in Equation (1)) and the first threshold in association with each other. The specifier 19 reads, for each block P, the first threshold corresponding to the number of partial regions 50 included in the block P from the storage 11, and uses the read first threshold for the specification whether the block P is the unsteady block.

Furthermore, the specifier 19 specifies the presence or absence of congestion of the objects on the block P in which M≥T1 is satisfied using the sum of the densities of the objects in the partial regions 50 included in the block P. Specifically, the specifier 19 specifies, for each block P, the presence or absence of congestion of the objects using Equation (2).

$$D = \sum_{i=1}^{n} m_i \quad (2)$$

where D represents the sum of the densities of the objects in the partial regions 50 included in the block P, and n, i, and $m_i$ represent the same as those in Equation (1).

The specifier 19 specifies, to be in the state in which a large number of objects move while being congested, the block P in which the sum D of the densities of the objects in the partial regions 50 included in the block P is equal to or larger than a fifth threshold, out of the blocks P determined to be in the unsteady state using the kinetic momentum M. The specifier 19 specifies, to be the unsteady block in the state in which a large number of objects move while being congested, the block P in which M≥T1 and D≥T5 are satisfied. T5 represents the fifth threshold.

The specifier 19 specifies, to be in the state in which a small number of objects move, the block P in which the sum D of the densities of the objects in the partial regions 50 included in the block P is smaller than the fifth threshold, out of the blocks P determined to be in the unsteady state using the kinetic momentum M. The specifier 19 specifies, to be the unsteady block in the state in which a small number of objects move, the block P in which M≥T1 and D<T5 are satisfied.

The specifier 19 preliminarily stores, in the storage 11, the number of partial regions 50 included in the block P (i.e., the value of n in Equation (2)) and the fifth threshold in association with each other. The specifier 19 reads, for each block P, the fifth threshold corresponding to the number of partial regions 50 included in the block P from the storage 11, and uses the read fifth threshold for the specification of the presence or absence of congestion of the objects.

Figure 7:
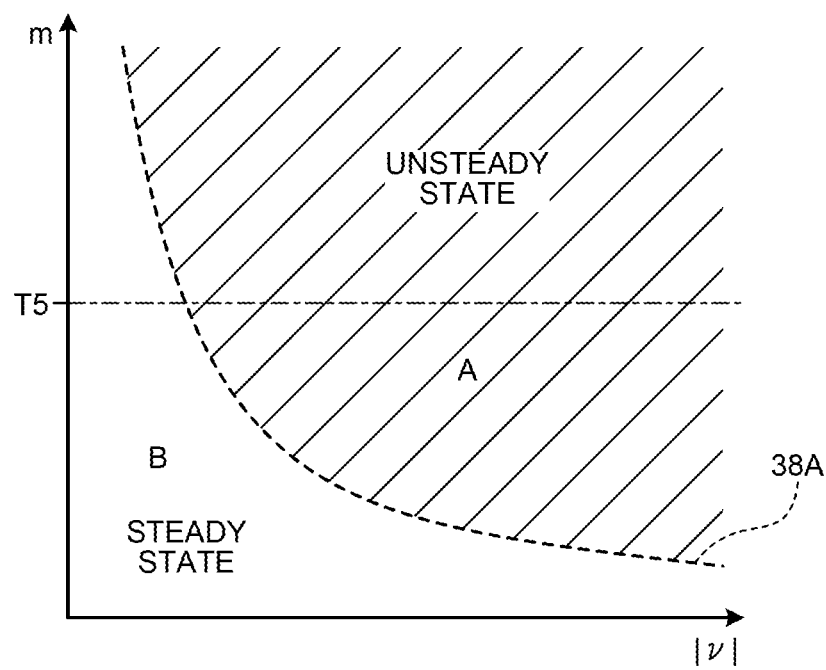
FIG. 7 is a diagram for explaining a threshold.

FIG. 7 is a diagram for explaining the threshold when only a single partial region 50 is included in the block P. In FIG. 7, a line 38A represents the first threshold T1. In FIG. 7, a line T5 represents the fifth threshold T5.

In FIG. 7, a space A is the space that indicates the unsteady state. In the space A, the value of m×|v|, which is a multiplication value of the density and the absolute value of the moving amount, is equal to or larger than the first threshold T1 represented by the line 38A. A space B is the space that indicates the steady state. In the space B, the value of m×|v| is smaller than the first threshold T1 represented by the line 38A. In the space A indicating the unsteady state, the space in which the value of the density (m) is equal to or larger than the fifth threshold T5 is the space that indicates the state in which a large number of objects are congested. In the space A indicating the unsteady state, the space in which the value of the density (m) is smaller than the fifth threshold T5 is the space that indicates the state in which a small number of objects move.

As described above, the specifier 19 specifies, for each of the blocks P (blocks P1 to P9) included in the image 33, the unsteady block in the unsteady state using the kinetic momentum M of the objects calculated by the third calculator 18. Furthermore, the specifier 19 specifies the presence or absence of congestion of the objects (the state in which a large number of objects move while being congested or the state in which a small number of objects move) in the unsteady block using the kinetic momentum M of the objects.

The processing performed by the set unit 14, the first calculator 15, the second calculator 16, the divider 17, the third calculator 18, and the specifier 19 makes it possible to specify the presence or absence of congestion of the objects in each block P in accordance with an imaging time, for each of the multiple images taken in time series, which images are acquired by the acquirer 13.

Figure 8:
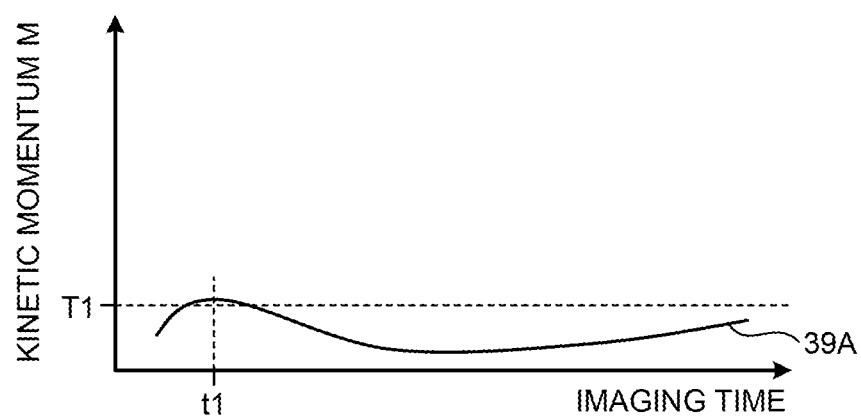
FIG. 8 is a diagram for explaining how to specify an unsteady block.

FIG. 8 is a diagram for explaining how to specify an unsteady block. In FIG. 8, a line 39A represents an exemplary change in calculation result of the kinetic momentum M in a specific block P. In the example illustrated in FIG. 8, the kinetic momentum M exceeds the first threshold T1 at an imaging time t1. In this case, the specifier 19 specifies that the block P in the image 33 taken at the imaging time t1 is the unsteady block in the unsteady state. At this time, the specifier 19 can also specify the presence or absence of congestion of the objects in the block P (the state in which a large number of objects move while being congested or the state in which a small number of objects move) by the specification using the fifth threshold T5.

The following describes a case in which kinetic energy of the objects is calculated as the statistical amount.

In this case, the third calculator 18 calculates, for each block P, as the kinetic energy of the objects in the block P, the sum of the multiplication values obtained by multiplying the density of the object by the squire of the moving amount in the partial region 50 for each of the partial regions 50 included in the block P.

Specifically, the third calculator 18 calculates a kinetic energy K of the objects for each block P using Equation (3).

$$K = \sum_{i=1}^{n} m_i \times v_i^2 \quad (3)$$

where K represents the kinetic energy of the objects in the block P, and i, $m_i$, $v_i$, and n represent the same as those in Equation (1).

The third calculator 18 calculates, for each partial region 50 in the block P, the multiplication value obtained by multiplying the squire of the moving amount derived from the optical flow 35 by the density of the object. The third calculator 18 calculates, as the kinetic energy K of the objects, the sum (total value) of the respective multiplication values in the partial regions 50 included in the block P.

In this case, the specifier 19 specifies, to be the unsteady block, the block P in which the kinetic energy K of the objects calculated by the third calculator 18 is equal to or larger than a second threshold out of the blocks P (blocks P1 to P9) in the image 33. The specifier 19 specifies, to be the unsteady block in the unsteady state, the block P in which K≥T2 is satisfied. T2 represents the second threshold.

The specifier 19 preliminarily stores, in the storage 11, the number of partial regions 50 included in the block P (i.e., the value of n in Equation (3)) and the second threshold in association with each other. The specifier 19 reads, for each block P, the second threshold corresponding to the number of partial regions 50 included in the block P from the storage 11, and uses the read second threshold for the specification whether the block P is the unsteady block.

Furthermore, the specifier 19 specifies the presence or absence of congestion of the objects on the block P in which K≥T2 is satisfied using the sum of the densities of the objects in the partial regions 50 included in the block P. Specifically, the specifier 19 specifies, for each block P, the presence or absence of congestion of the objects using Equation (2).

Specifically, the specifier 19 specifies, to be in the state in which a large number of objects move while being congested, the block P in which the sum D of the densities of the objects in the partial regions 50 included in the block P is equal to or larger than a sixth threshold, out of the blocks P specified to be in the unsteady state using the kinetic energy K. The specifier 19 specifies, to be the unsteady block in the unsteady state in which a large number of objects move while being congested, the block P in which K≥T2 and D≥T6 are satisfied. T6 represents the sixth threshold.

The specifier 19 specifies, to be in the state in which a small number of objects move, the block P in which the sum D of the densities of the objects in the partial regions 50 included in the block P is smaller than the sixth threshold, out of the blocks P specified to be in the unsteady state using the kinetic energy K. The specifier 19 specifies, to be the unsteady block in the unsteady state in which a small number of objects move, the block P in which K≥T2 and D<T6 are satisfied.

The specifier 19 preliminarily stores, in the storage 11, the number of partial regions 50 included in the block P (i.e., the value of n in Equation (2)) and the sixth threshold in association with each other. The specifier 19 reads, for each block P, the sixth threshold corresponding to the number of partial regions 50 included in the block P from the storage 11, and uses the read sixth threshold for the specification of the presence or absence of congestion of the objects.

As described above, the specifier 19 specifies, for each of the blocks P (blocks P1 to P9) included in the image 33, the unsteady block in the unsteady state using the kinetic energy K of the objects calculated by the third calculator 18. Furthermore, the specifier 19 specifies the presence or absence of congestion of the objects (the state in which a large number of objects move while being congested or the state in which a small number of objects move) in the unsteady block using the kinetic energy K of the objects.

The processing performed by the set unit 14, the first calculator 15, the second calculator 16, the divider 17, the third calculator 18, and the specifier 19 makes it possible to specify the presence or absence of congestion of the objects in the unsteady block in accordance with an imaging time, for each of the multiple images taken in time series, which images are acquired by the acquirer 13.

Figure 9:
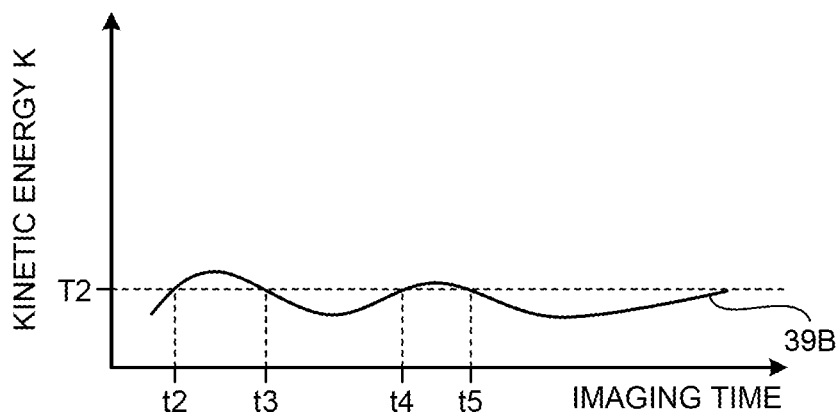
FIG. 9 is another diagram for explaining how to specify an unsteady block.

FIG. 9 is a diagram for explaining how to specify an unsteady block. In FIG. 9, a line 39B represents an exemplary change in calculation result of the kinetic energy K in a specific block P. In the example illustrated in FIG. 9, the kinetic energy K exceeds the second threshold T2 in a time period from an imaging time t2 to an imaging time t3, and a time period from an imaging time t4 to an imaging time t5. In this case, the specifier 19 specifies that the blocks P in the images 33 taken in the time period from the imaging time t2 to the imaging time t3, and the time period from the imaging time t4 to the imaging time t5 are the unsteady blocks in the unsteady state. At this time, the specifier 19 can also specify the presence or absence of congestion of the objects in the blocks P (the state in which a large number of objects move while being congested or the state in which a small number of objects move) by the specification using the sixth threshold T6.

The following describes a case in which the accumulation degree of the objects is calculated as the statistical amount.

In this case, the third calculator 18 calculates, for each block P, as the accumulation degree of the objects in the block, the sum of the multiplication values obtained by multiplying the density of the object by the reciprocal of the moving amount in the partial region 50 for each of the partial regions 50 included in the block P. The reciprocal of the moving amount may be the reciprocal of the sum obtained by adding a constant to the moving amount.

Specifically, the third calculator 18 calculates an accumulation amount S of the objects for each block P using Equation (4).

$$S = \sum_{i=1}^{n} (m_i \times g(v_i)) \qquad (4)$$

where S represents the accumulation degree of the objects in the block P, i, $m_j$, $v_i$, and n represent the same as those in Equation (1), and $g(v_i)$ is a function represented by Equation (5).

$$g(v_i) = \frac{1}{(v_i + \alpha)} \qquad (5)$$

where α is an integer equal to or larger than zero. Any value may preliminarily be set to α.

The third calculator 18 calculates, for each partial region 50 in the block P, the multiplication value obtained by multiplying the density of the object by the reciprocal of the moving amount. The third calculator 18 calculates, as the accumulation degree S of the objects, the sum (total value) of the respective multiplication values in the partial regions 50 included in the block P.

In this case, the specifier 19 specifies, to be the unsteady block, the block P in which the accumulation degree S of the objects calculated by the third calculator 18 is equal to or larger than a third threshold out of the blocks P (blocks P1 to P9) in the image 33. The specifier 19 specifies, to be the unsteady block, the block P in which S≥T3 is satisfied. T3 represents the third threshold.

The specifier 19 preliminarily stores, in the storage 11, the number of partial regions 50 included in the block P (i.e., the value of n in Equation (4)) and the third threshold in association with each other. The specifier 19 reads, for each block P, the third threshold corresponding to the number of partial regions 50 included in the block P from the storage 11, and uses the read third threshold for the specification whether the block P is the unsteady block.

In the present embodiment, the specifier 19 specifies that the accumulation of the objects occurs (i.e., a large number of objects are accumulated) in the block P in which the accumulation degree S of the objects is equal to or larger than the third threshold.

Figure 10:
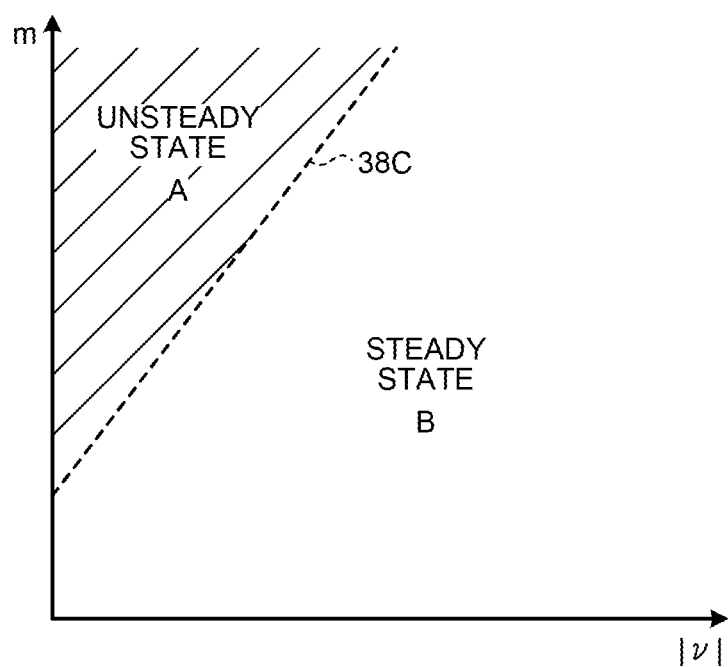
FIG. 10 is another explanatory view of a threshold.

FIG. 10 is an explanatory view of the threshold when only a single partial region 50 is included in the block P (i.e., n=1 in Equation (4)). In FIG. 10, a line 38C represents the third threshold T3.

In FIG. 10, a space A is the space that indicates the occurrence of the accumulation of the objects. In the space A, the accumulation degree S, which is represented by the densities and the moving amounts, is equal to or larger than the third threshold T3 represented by the line 38C. A space B is the space that indicates the steady state. In the space B, the accumulation degree S, which is represented by the densities and the moving amounts, is smaller than the third threshold T3 represented by the line 38C.

As described above, the specifier 19 specifies, for each of the blocks P (blocks P1 to P9) included in the image 33, the unsteady block in the unsteady state using the accumulation degree S of the objects calculated by the third calculator 18. Furthermore, the specifier 19 specifies whether the accumulation of the objects occurs in the unsteady block using the accumulation degree S of the objects.

The processing performed by the set unit 14, the first calculator 15, the second calculator 16, the divider 17, the third calculator 18, and the specifier 19 makes it possible to specify the presence or absence of accumulation of the objects in the unsteady block in accordance with an imaging time, for each of the multiple images taken in time series, which images are acquired by the acquirer 13.

Figure 11:
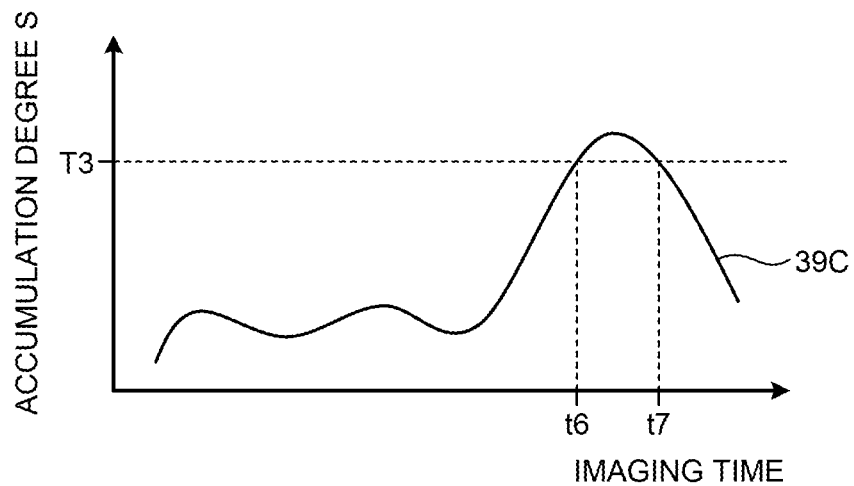
FIG. 11 is another diagram for explaining how to specify an unsteady block.

FIG. 11 is a diagram for explaining how to specify an unsteady block. In FIG. 11, a line 39C represents an exemplary change in calculation result of the accumulation degree S in a specific block P. In the example illustrated in FIG. 11, the accumulation degree S exceeds the third threshold T3 in a time period from an imaging time t6 to an imaging time t7. In this case, the specifier 19 specifies that the blocks P in the images 33 taken in the time period from the imaging time t6 to the imaging time t7 are the unsteady blocks in the unsteady state. At this time, the specifier 19 specifies that the accumulation of the objects occurs in the unsteady blocks.

The following describes a case in which potential energy of the objects is calculated as the statistical amount.

In this case, the third calculator 18 calculates, for each block P, the multiplication value obtained by multiplying the density of the object in the partial region 50 included in the block P, the reciprocal of the moving amount of the object in the region 50, and the density of the object in another partial region 50 included in the block P. The third calculator 18 calculates, as the potential energy of the objects in the block P, the sum of the division values obtained by dividing the multiplication value by the distance between the partial region 50 and the other partial region 50, for each region 50 included in the block P.

Specifically, the third calculator 18 calculates the kinetic energy K of the objects for each block P using Equation (6).

$$U = \sum_{i=1, j=1, i \neq j}^{n} \frac{m_i \times m_j \times g(v_i)}{r_{ij}} \qquad (6)$$

where U represents the potential energy of the objects in the block P, i, $m_i$, $v_1$, and n represent the same as those in Equation (1), and $g(v_i)$ is the function represented by Equation (5).

in Equation (6), j is an integer equal to or larger than one and equal to or smaller than n, j represents the position of each partial region 50 in the block P and the different position from that represented by i, i.e., i≠j, and $r_{ij}$ represents the distance between the partial region 50 at the position i and the partial region 50 at the position j in the same block P. For example, $r_{ij}$ represents the shortest distance between the center of the partial region 50 at the position i and the center of the partial region 50 at the position j in the image 33.

In this case, the specifier 19 specifies, to be the unsteady block, the block P in which the potential energy U of the objects calculated by the third calculator 18 is equal to or larger than a fourth threshold out of the blocks P (blocks P1 to P9) in the image 33. The specifier 19 specifies, to be the unsteady block, the block P in which U 2 T4 is satisfied. T4 represents the fourth threshold.

The specifier 19 preliminarily stores, in the storage 11, the number of partial regions 50 included in the block P (i.e., the value of n in Equation (6)) and the fourth threshold in association with each other. The specifier 19 reads, for each block P, the fourth threshold corresponding to the number of partial regions 50 included in the block P from the storage 11, and uses the read fourth threshold for the specification whether the block P is the unsteady block.

In the present embodiment, the specifier 19 specifies, as the unsteady block in the unsteady state, the block P in which the potential energy U of the objects is equal to or larger than the fourth threshold. Furthermore, the specifier 19 specifies that the accumulation of the objects and an aggregation of a large number of objects occur in the unsteady block.

As described above, the specifier 19 specifies, for each of the blocks P (blocks P1 to P9) included in the image 33, the unsteady block in the unsteady state using the potential energy U of the objects calculated by the third calculator 18. Furthermore, the specifier 19 specifies that the accumulation of the objects and the aggregation of a large number of objects occur in the unsteady block using the potential energy U of the objects.

The processing performed by the set unit 14, the first calculator 15, the second calculator 16, the divider 17, the third calculator 18, and the specifier 19 makes it possible to specify the presence or absence of accumulation of the objects and the presence or absence of aggregation of a large number of objects in the unsteady block in accordance with an imaging time, for each of the multiple images taken in time series, which images are acquired by the acquirer 13.

Figure 12:
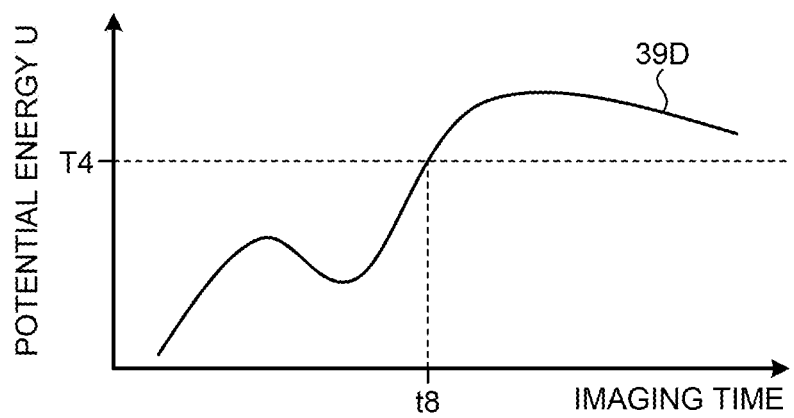
FIG. 12 is another diagram for explaining how to specify an unsteady block.

FIG. 12 is a diagram for explaining how to specify an unsteady block. In FIG. 12, a line 39D represents an exemplary change in calculation result of the potential energy U in a specific block P. In the example illustrated in FIG. 12, the potential energy U exceeds the fourth threshold T4 after an imaging time t8. In this case, the specifier 19 specifies that the blocks P in the images 33 taken after the imaging time t8 are the unsteady blocks in the unsteady state. At this time, the specifier 19 specifies that the accumulation of the objects and the aggregation of a large number of objects occur in the blocks P specified to be the unsteady blocks.

In the above description, the third calculator 18 calculates, as the statistical amount, each of the kinetic momentum M, the kinetic energy U, the accumulation degree S, and the potential energy U, as an example. The specifier 19 specifies the unsteady block using each of the kinetic momentum M, the kinetic energy K, the accumulation degree S, and the potential energy U, as an example.

The third calculator 18 may calculate, as the statistical amount, a combination of the kinetic momentum of, the kinetic energy of, the accumulation degree of, and the potential energy of the objects calculated on the basis of one or more partial regions 50 included in the block P.

In this case, the specifier 19 may specify that the block P, out of the blocks P (blocks P1 to P9), in which the statistical amount calculated by the third calculator 18 is equal to or greater than a predetermined threshold is the unsteady block in the unsteady state. The specifier 19 may specify the type of the unsteady state on the basis of the value of the statistical amount.

Referring back to FIG. 1, the display controller 20 controls display of an image on the display 21A. The display controller 20 controls the display of a display image on the display 21A, for example. In the display image, the unsteady block is emphasized that is specified by the specifier 19 out of the blocks P (blocks P1 to P9) included in the image 33.

Figure 13:
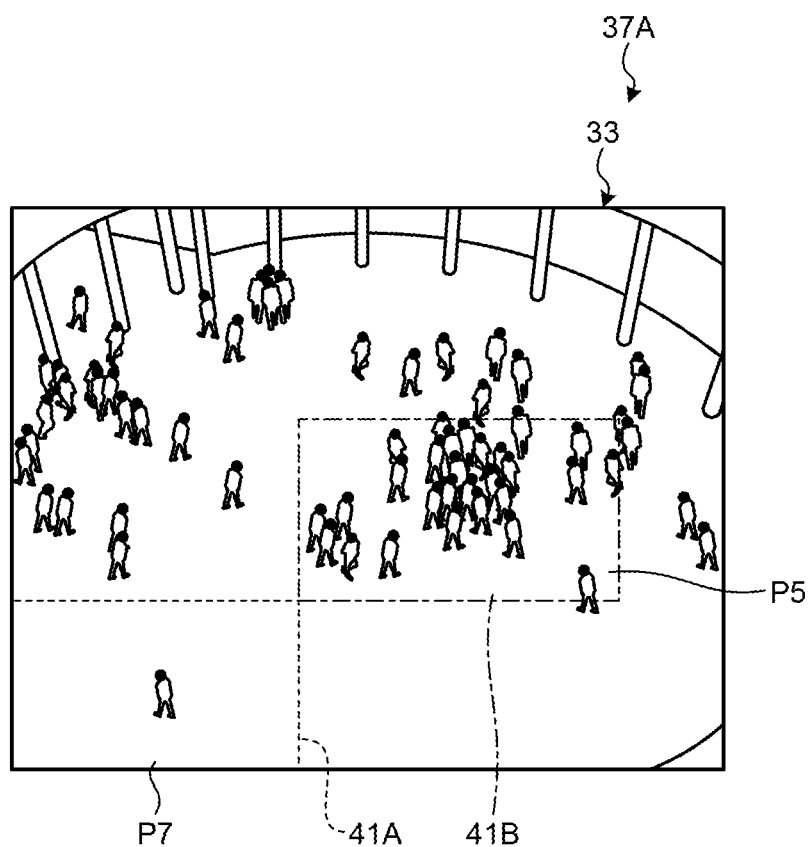
FIG. 13 is a schematic diagram illustrating an example of a display image.

FIG. 13 is a schematic diagram illustrating an example of a display image 37A. The specifier 19 is assumed to specify the blocks P5 and P7 to be the unsteady blocks, for example. The specifier 19 is also assumed to determine the state in the block P5 to be the state in which a large number of objects move while being congested while the specifier 19 is assumed to determine the state in the block P7 to be the state in which a small number of objects move.

In this case, the display controller 20 displays the display image 37A illustrated in FIG. 13 on the display 21A, for example. In the display image 37A, a frame line 41B that emphasizes the block P5 specified to be the unsteady block and a frame line 41A that emphasizes the block P7 specified to be the unsteady block are superimposed on the image 33. The technique to emphasize the unsteady block is not limited to a form that encloses the unsteady block with the frame line. For example, the display controller 20 may display the unsteady block in a different form from that of the block P in the steady state. The different display form differs from that of the block P in the steady state in at least one of a color, blinking intervals, luminance, chroma, and intensity.

The display controller 20 preferably displays the unsteady block in a display form according to the type of unsteady state. Specifically, the display controller 20 displays, in different display forms, the block P7 in the state in which a large number of objects move while being congested and the block P5 in the state in which a small number of objects move. In the example illustrated in FIG. 13, types of lines that enclose the blocks P5 and P7 differ from each other (lines 41B and 41A). The display form is not limited to the use of different types of lines.

The display controller 20 may control display, on the display 21A, a display image in which information indicative of the unsteady state is superimposed on the unsteady block specified by the specifier 19 out of the blocks P (blocks P1 to P9) included in the image 33.

Figure 14:
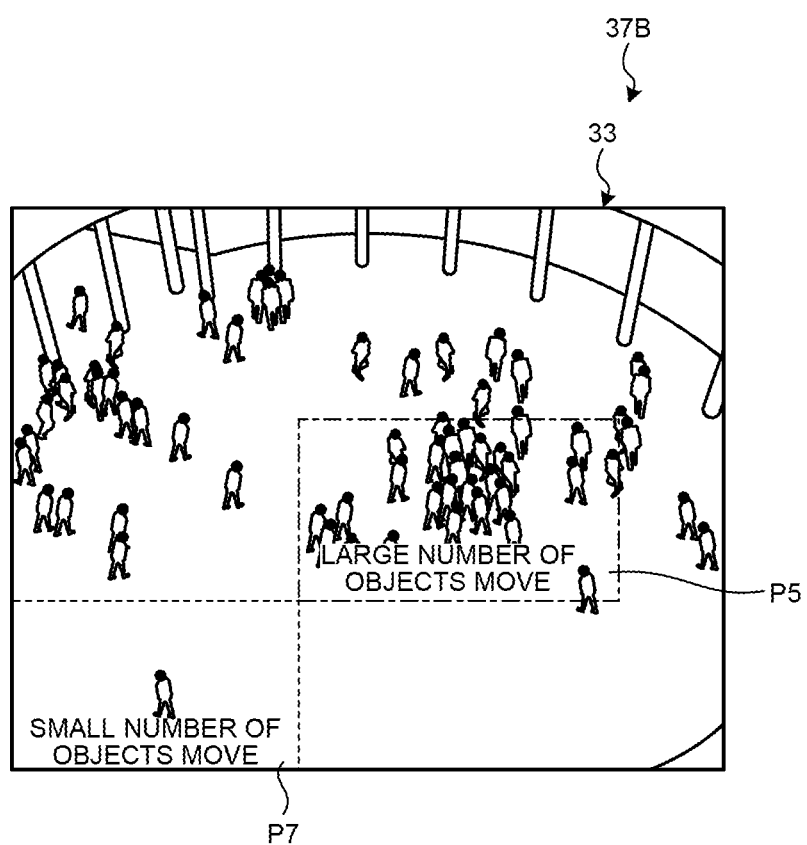
FIG. 14 is a schematic diagram illustrating another example of the display image.

FIG. 14 is a schematic diagram illustrating an example of a display image 37B. The specifier 19 is assumed to specify the blocks P5 and P7 to be the unsteady blocks, for example. The specifier 19 is assumed to determine the state in the block P5 to be the state in which a large number of objects move while being congested while the specifier 19 is assumed to determine the state in the block P7 to be the state in which a small number of objects move.

In this case, the display controller 20 displays the display image 37B illustrated in FIG. 14 on the display 21A, for example. In the display image 37B, as information indicative of the unsteady state, a character of "LARGE NUMBER OF OBJECTS MOVE" is superimposed on the block P5 specified to be the unsteady block in the image 33. In the display image 37B, as information indicative of the unsteady state, a character of "SMALL NUMBER OF OBJECTS MOVE" is superimposed on the block P7 specified to be the unsteady block in the image 33.

The display controller 20 may superimpose information (e.g., a character) that is indicative of the imaging time of the image 33 at which the unsteady state occurs on the block P specified to be the unsteady block. This display makes it possible to provide the occurrence time (imaging time) of the unsteady state to the user.

The display controller 20 may display the display image 37B on the display 21A, as described above.

Figure 15A:
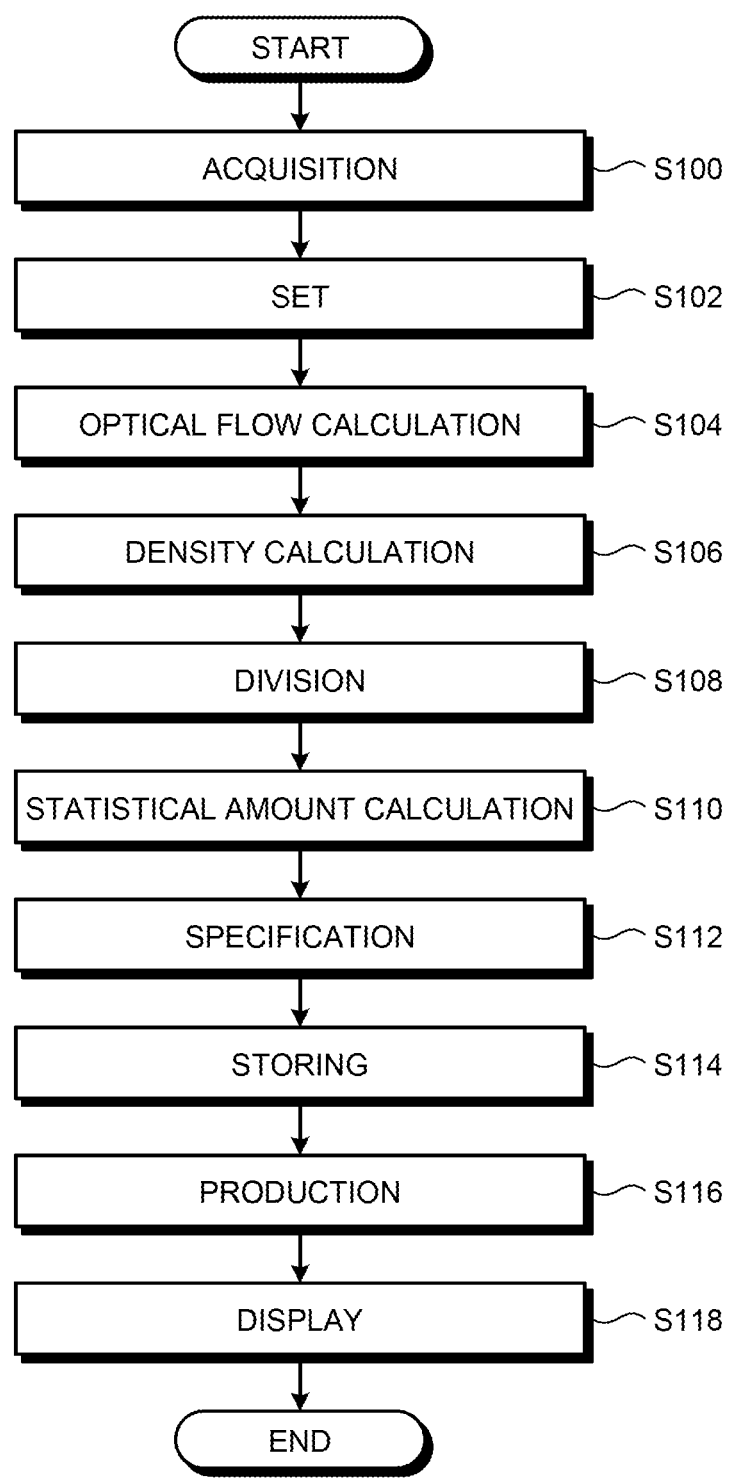
FIG. 15A is a flowchart illustrating an exemplary procedure of image analysis processing.

The following describes a procedure of the image analysis processing performed by the image analyzer 12. FIG. 15A is a flowchart illustrating an exemplary procedure of the image analysis processing performed by the image analyzer 12.

The acquirer 13 acquires an image to be analyzed (step S100). The set unit 14 sets the multiple partial regions 50 in the image acquired at step S100 (step S102).

The first calculator 15 calculates the optical flow 35 for each of the regions 50 set at step S102 (step S104). The second calculator 16 calculates the density of the object included in the partial region 50 for each of the partial regions 50 set at step S102 (step S106).

The divider 17 divides the image serving as the analysis target into the multiple blocks P (step S108). The third calculator 18 calculates the statistical amount for each of the blocks P (step S110).

The specifier 19 specifies that the block P in which the statistical amount calculated at step S110 is equal to or greater than a predetermined threshold is the unsteady block in the unsteady state, out of the blocks P (blocks P1 to P9) divided at step S108 (step S112).

The specifier 19 stores, in the storage 11, identification information about the specified unsteady block, the type of the specified unsteady state, and identification information (e.g., the imaging time) about the image 33 from which the unsteady block is specified in association with one another (step S114).

The display controller 20 produces an image to be displayed on the display 21A (step S116). The display controller 20 produces the display image (refer to the display image 37A illustrated in FIG. 13) in which the unsteady block is emphasized that is specified by the specifier 19 out of the blocks P (blocks P1 to P9) included in the image 33, for example. The display controller 20 may produce the display image 37B (refer to FIG. 14).

The display controller 20 controls such that the produced display image is displayed on the display controller 20 (step S118). Then, this routine ends.

The image analyzer 12 preferably repeats the processing from step S102 to step S118 every time a new image is acquired at step S100.

As described above, the image analyzer 12 in the present embodiment includes the set unit 14, the first calculator 15, the second calculator 16, the divider 17, the third calculator 18, and the specifier 19. The set unit 14 sets the multiple partial regions 50 in the image 33. The first calculator 15 calculates the optical flow 35 in the partial region 50. The second calculator 16 calculates the density of the object included in the partial region 50. The divider 17 divides the image 33 into the multiple blocks P. The third calculator 18 calculates, for the block P, the statistical amount which is derived from the density and the moving amount of the object derived from the optical flow 35 for the partial region 50 included in the block P. The specifier 19 specifies the block P, out of the blocks P, as an unsteady block that is in an unsteady state on the basis of the statistical amount.

The image analyzer 12 in the present embodiment specifies the unsteady block in the unsteady state using the moving amounts of the objects derived from the optical flows 35 and the densities of the objects, as described above. The image analyzer 12 can, thus, specify the blocks P in more various unsteady states to be the unsteady blocks than in a case in which the unsteady block in the unsteady state is specified on the basis of only the moving amounts or the densities.

The image analyzer 12 in the present embodiment can, thus, increase the types of unsteady states that can be specified.

Figure 15B:
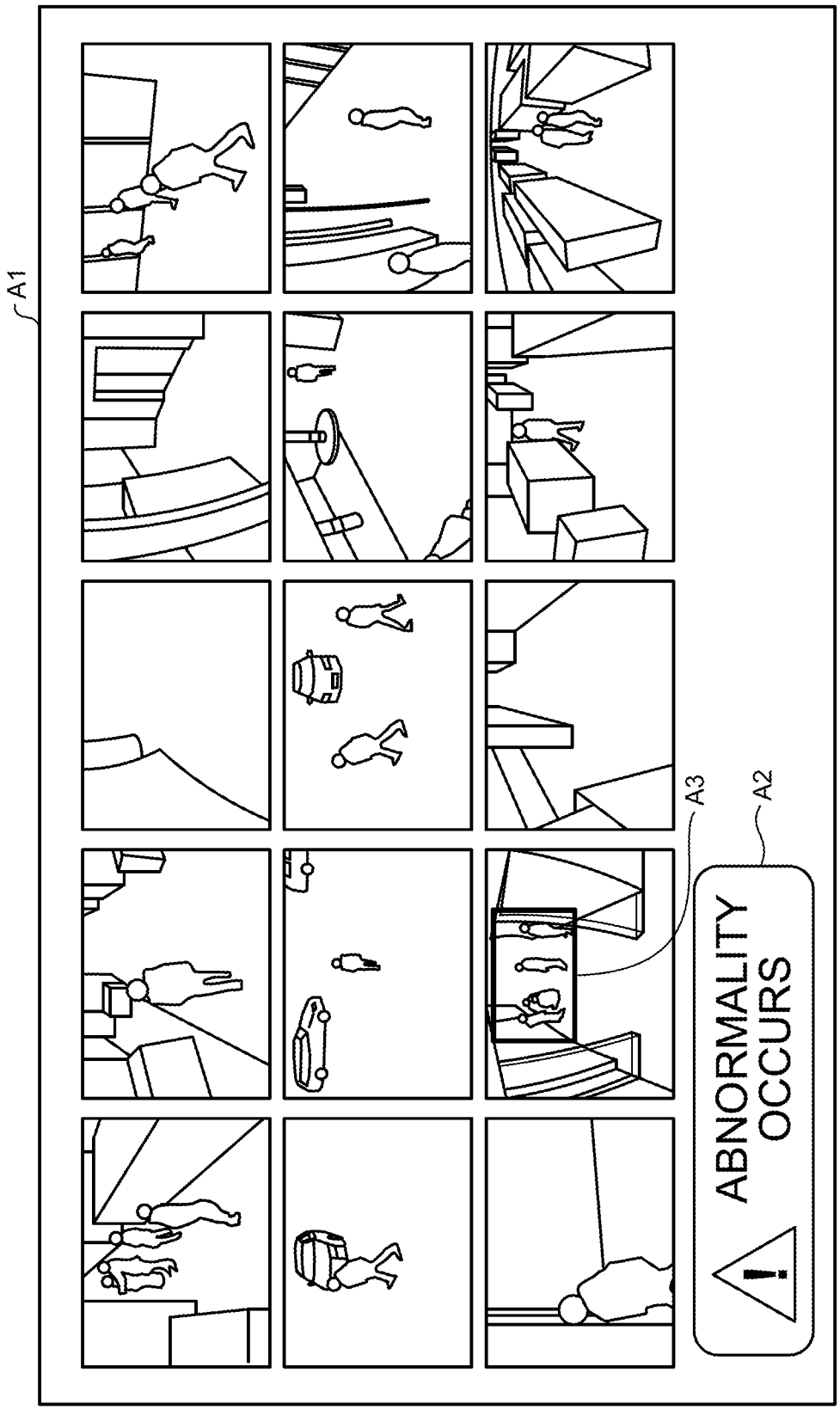
FIG. 15B is a schematic diagram illustrating still another example of the display image.

The display controller 20 may display a display image indicative of an unsteady block on the display 21A. FIG. 15B is a schematic diagram illustrating an example of the display image A1. The display image A1 illustrated in FIG. 15B can be used in supporting security work.

In general, buildings, commercial facilities, and so on are provided with surveillance cameras at multiple locations; an observer watches video of the surveillance cameras to check for abnormalities in a specific room. If a suspicious person or substance is found in the video of a surveillance camera, the observer contacts a security company or a security guard around and thus the security guard who gets contacted leaves for the site to take an appropriate action. However, it is difficult to find an abnormality because the observer has to simultaneously watch video images of the multiple surveillance cameras, as illustrated in FIG. 15B. If the observer overlooks a critical issue or falls to see the critical issue in time, it results in no action for the abnormality and accordingly degrades the level of security.

In contrast, the image analyzer 12 according to the first embodiment specifies an unsteady block in an unsteady state using the density and the moving amount of the object derived from the optical flow 35. The display controller 20 displays the unsteady block in the unsteady state in emphasis (e.g., an annotation A3 is displayed at the unsteady block in the unsteady state). This way allows the observer to easily notice and find the abnormality immediately, thereby increasing the level of security.

Second Embodiment

In a second embodiment, an example of the density calculation processing is described that is performed by the second calculator 16 in the image analysis system 10.

Figure 16:
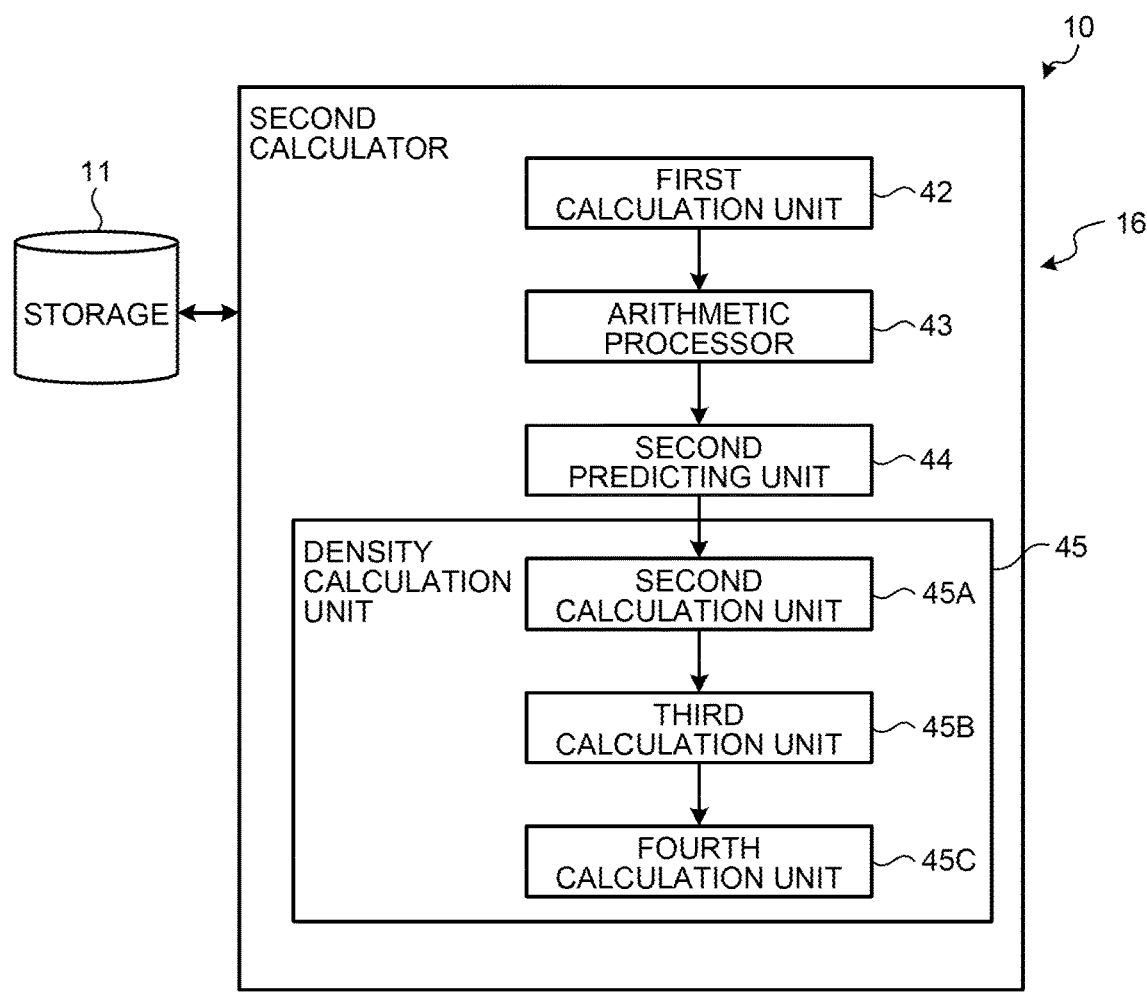
FIG. 16 is a block diagram illustrating an exemplary structure of a second calculator.

FIG. 16 is a block diagram illustrating an exemplary structure of the second calculator 16 included in the image analysis system 10.

The second calculator 16 includes a first calculation unit 42, an arithmetic processor 43, a second predicting unit 44, and a density calculation unit 45.

A part or the whole of the first calculation unit 42, the arithmetic processor 43, the second predicting unit 44, and the density calculation unit 45 may be achieved by causing a processing unit such as a CPU to execute a program, i.e., by software, hardware such as an IC, or by both of software and hardware.

The first calculation unit 42 calculates the feature value of each partial region 50 that is set by the set unit 14 (see FIG. 1). The feature value is a value representing the feature of the corresponding partial region 50. Examples of the feature value include a value obtained by discretizing the pixel values of the pixels constituting the partial region 50 and arranging the discretized pixel values in one dimension, and a value obtained by normalizing the abovementioned value using the difference (i.e., the gradient) in neighboring pixel values among the pixel values arranged in one dimension. Alternatively, as the feature value, it is also possible to use the SIFT feature (see D. Lowe, "Object recognition from local scale-invariant features", Int. Conf. Comp. Vision, Vol. 2, pp. 1150-1157, 1999). The SIFT feature is a histogram feature that is robust against minute variations.

FIGS. 17A to 17D are explanatory views of the image 33, the partial region 50, and a label 51, which is described in detail later.

Figure 17A:
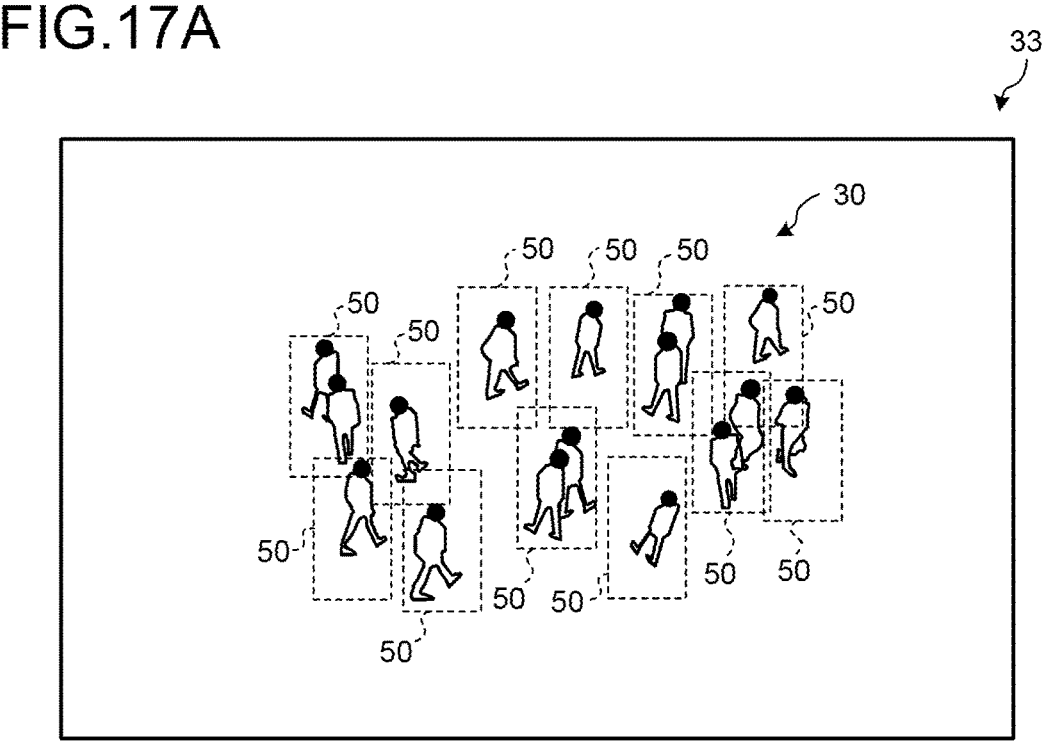
FIGS. 17A to 17D are explanatory views of a correction image, a partial region, and a label.
Figure 17B:
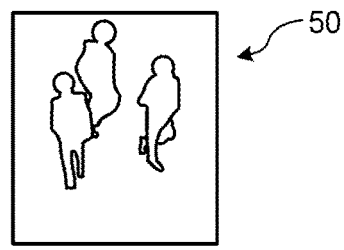
Figure 17C:
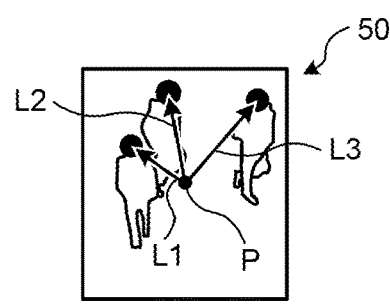
Figure 17D:
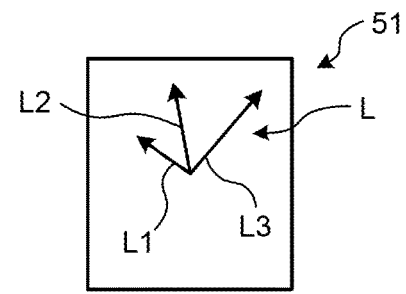

FIG. 17A is a schematic diagram illustrating an example of the image 33. As described in the first embodiment, the image 33 includes the objects 30. FIG. 17B is a schematic diagram illustrating an example of the partial region 50.

The first calculation unit 42 calculates a feature value of each of the partial regions 50 set by the set unit 14 (refer to FIG. 1). As the number of the partial regions 50 set by the set unit 14 in the image 33 increases, the second calculator 16 can learn a regression model that can calculate the density with heightened accuracy in the processing described later.

Figure 18:
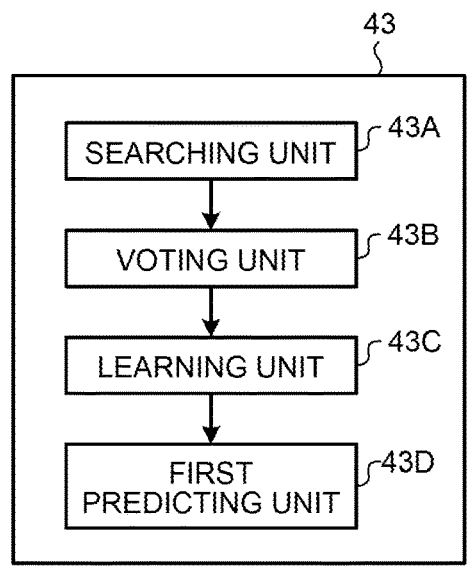
FIG. 18 is a block diagram illustrating an exemplary structure of an arithmetic processor.

Returning to FIG. 16, the arithmetic processor 43 calculates a regression model and representative labels. FIG. 18 is a block diagram illustrating an exemplary configuration of the arithmetic processor 43.

The arithmetic processor 43 includes a searching unit 43A, a voting unit 43B, a learning unit 43C, and a first predicting unit 43D. Herein, some or all of the searching unit 43A, the voting unit 43B, the learning unit 43C, and the first predicting unit 43D can be implemented by making a processor such as a CPU execute computer programs, that is, can be implemented using software; or can be implemented using hardware such as an integrated circuit (IC); or can be implemented using a combination of software and hardware.

The searching unit 43A attaches a label to the feature value of each partial region 50. A label represents the relative positions between the objects captured in the corresponding partial region 50 and a first position in that partial region 50. More particularly, firstly, the searching unit 43A searches for the objects captured in each partial region 50 set by the set unit 14. Then, for each partial region 50, the searching unit 43A generates, as the label, a vector representing the relative positions between the first position in the partial region 50 and all objects captured in that partial region 50. Then, the searching unit 43A attaches the generated label to the feature value of the corresponding partial region 50.

Herein, the first position can be a predetermined arbitrary position in the partial region 50. In the second embodiment, the explanation is given under the assumption that the first position represents the center position of the partial region 50 (the center of the partial region 50).

Returning to the explanation with reference to FIGS. 17A to 17D, FIGS. 17C and 17D are explanatory diagrams for explaining the label 51. For example, the searching unit 43A searches for the objects captured in each partial region 50 illustrated in FIG. 17B. Then, the searching unit 43A generates vectors L1, L2, and L3 (see FIG. 17C) that represent relative positions between a central position P of the partial region 50 and all objects captured in the partial region 50 (in the example illustrated in FIGS. 17B and 17C, three objects). Subsequently, to the feature value of the partial region 50, the searching unit 43A attaches a vector L, which represents a set of the vectors L1, L2, and L3, as the label 51 (see FIG. 17D).

Returning to the explanation with reference to FIG. 18, the voting unit 43B calculates, for each partial region 50, a histogram representing the distribution of the relative positions of the objects captured in that partial region 50.

Figure 19:
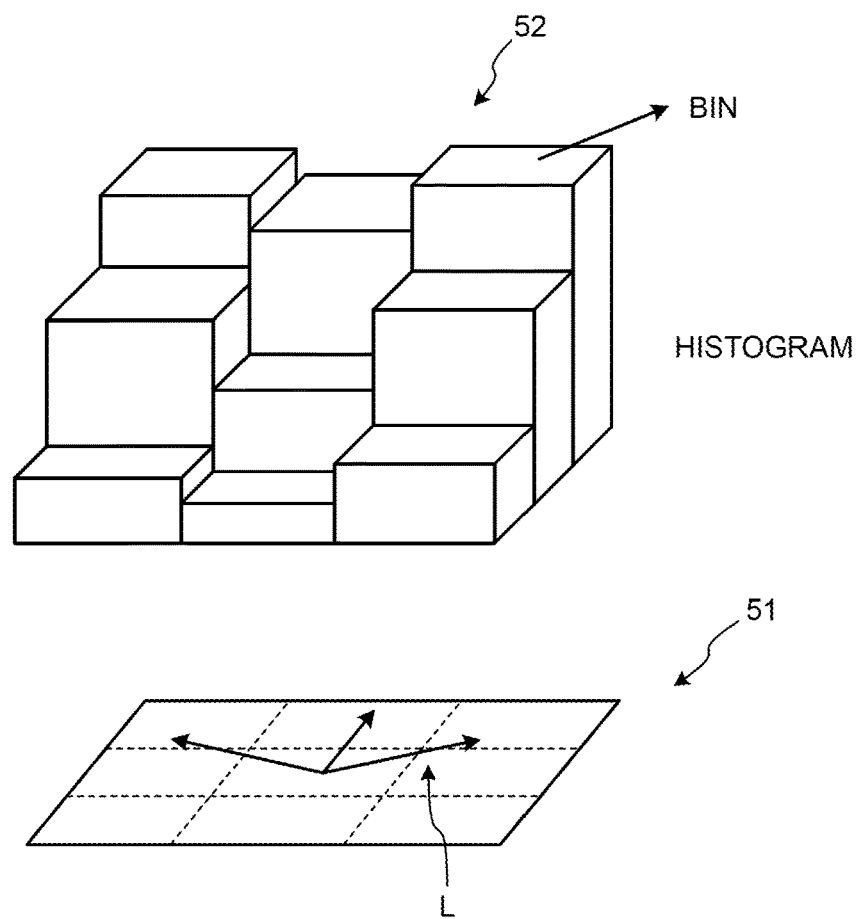
FIG. 19 is an explanatory view of the label and a histogram.

FIG. 19 is an explanatory diagram for explaining the label 51 and a histogram 52. As illustrated in FIG. 19, the voting unit 43B calculates the histogram 52 from the label 51.

The histogram 52 is a set of bins that are evenly arranged in the partial region 50. The size of the bins in the histogram 52 is determined based on the relative positions of the objects captured in the partial region 50.

For example, the size of the bin at a position b in the partial region 50 is expressed using Equation (7) given below.

$$B(b)=\Sigma N(b;o_j,\sigma) \quad (7)$$

In Equation (7), B(b) represents the size of the bin at the position b in the partial region 50. Moreover, $o_j$ represents the position of an object. Furthermore, in Equation (7), $N(b; o_j, \sigma)$ represents the value of the probability density function of a normal distribution of (center $o_j$, dispersion $\sigma$) at the position b.

Returning to the explanation with reference to FIG. 18, subsequently, the voting unit 43B votes the histogram 52 calculated for each partial region 50 into a parametric space. As a result, the voting unit 43B generates a voting histogram for each partial region 50.

Figure 20:
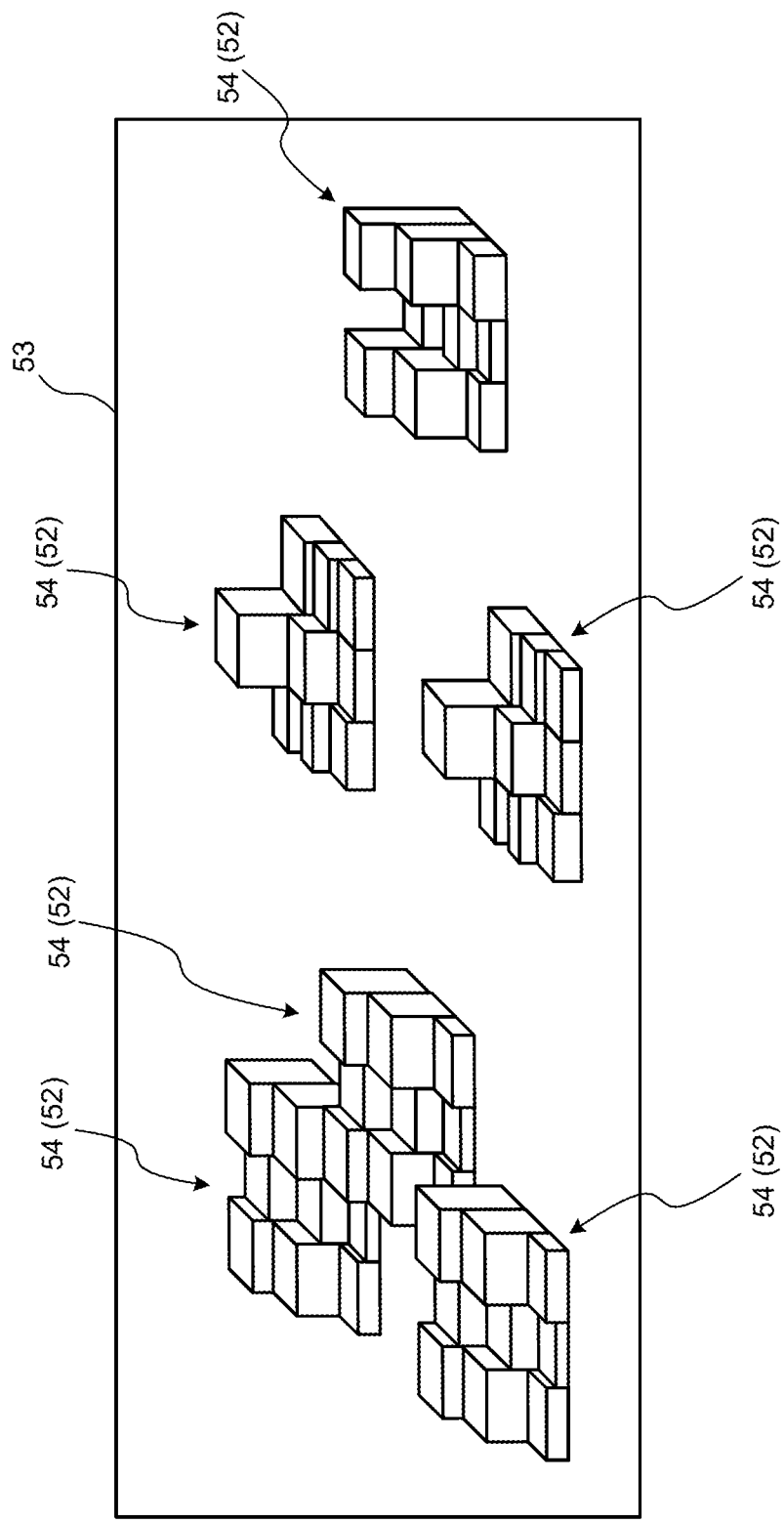
FIG. 20 is an explanatory view of a voting histogram.

FIG. 20 is an explanatory diagram for explaining voting histograms 54. When the histograms 52 are voted into the parametric space 53, it results in the generation of the voting histograms 54. In FIG. 20, the parametric space is simplified to two dimensions.

In the second embodiment, the explanation is given under the assumption that the parametric space is a three-dimensional parametric space (x, y, s). Herein, (x, y) represents a two-dimensional position (x, y) in the partial region. Moreover, (s) represents the size (s) of objects. Meanwhile, the parametric space can be a multidimensional parametric space in which the posture and orientation of the objects is added to the parameters mentioned above.

Returning to the explanation with reference to FIG. 18, the learning unit 43C learns a regression model that represents the relationship between the feature values of the partial regions 50 and the relative positions of the objects captured in those partial regions 50. More particularly, the learning unit 43C learns a regression model by dividing the feature value that has the label 51 attached thereto and that corresponds to each partial region 50 into a plurality of clusters in such a way that there is a decrease in the variability in the corresponding voting histogram.

In the second embodiment, the explanation is given for a case in which the regression model represents one or more random trees. A plurality of random trees represents a random forest. In the second embodiment, a cluster implies a leaf node that is an end node of a random tree.

In the second embodiment, learning of a regression model by the learning unit 43C implies determining a division index of each node from the root node to leaf nodes via child nodes in a random tree and determining the feature values belonging to leaf nodes. Herein, the feature values are attached with the label 51 as described above.

In the second embodiment, the learning unit 43C learns the regression model by determining the division index of each node from the root node to a plurality of leaf nodes via child nodes, and determines the feature values belonging to the leaf nodes in such a way that there is a decrease in the variability in the voting histogram 54.

Meanwhile, it is desirable that the learning unit 43C learns a plurality of regression models having different combinations of division indexes. In the second embodiment, the learning unit 43C varies the combinations of the division indexes of nodes, and learns a predetermined number of (hereinafter, referred to as T number of) regression models.

Figure 21:
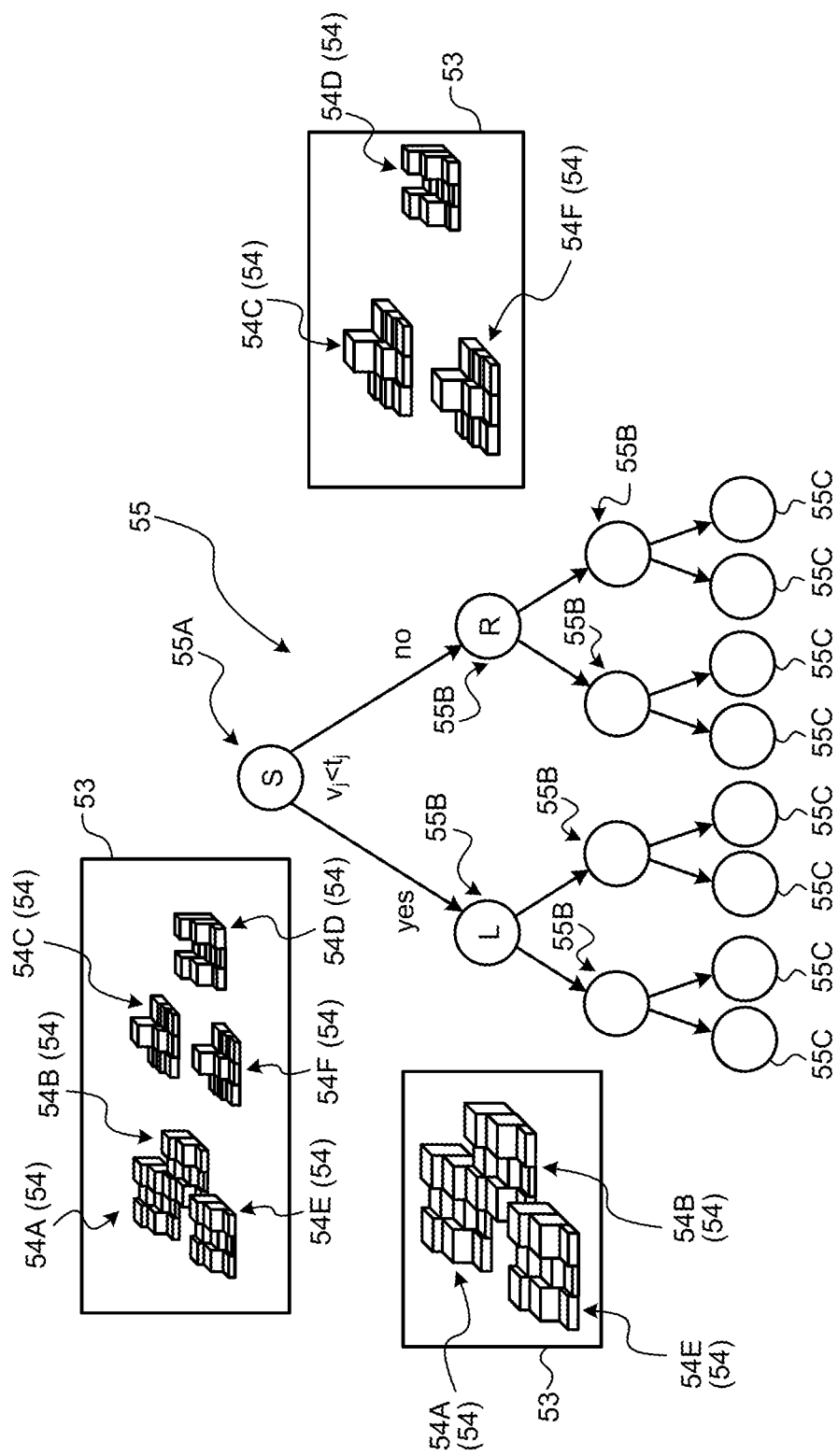
FIG. 21 is an explanatory view of a random tree.

FIG. 21 is an explanatory diagram for explaining a random tree 55.

In FIG. 21 are illustrated the voting histograms 54 in a parametric space 53 that is simplified to two dimensions. In the example illustrated in FIG. 21, voting histograms 54A to 54F represent the voting histograms 54 corresponding to the feature values of the multiple partial regions 50. In the following explanation, the feature value of the partial region 50 is sometimes referred to as a feature value v, which has a label attached thereto as described above.

Firstly, the learning unit 43C assigns, to "S" representing a root node 55A, all feature values v that have labels attached thereto and that are calculated by the first calculation unit 42 and the searching unit 43A.

Then, the learning unit 43C determines the division index at the time of dividing "S", which represents the root node 55A, into "L" and "R" representing two child nodes 55B. The division index is determined according to an element $v_j$ of the feature v and a threshold value $t_j$.

More particularly, the learning unit 43C determines the division index of the node to be divided in such a way that the variability in the voting histogram is small in the nodes obtained by division (the child nodes 55B or leaf nodes 55C). The division index is determined according to the element $v_j$ of the feature v and the threshold value $t_j$.

More specifically, the learning unit 43C determines the division index in the case in which the labeled feature value v satisfying the relationship "element $v_j$<threshold value $t_j$" is tentatively assigned to "L" representing the child node 55B (in the case of "yes" in FIG. 21) and the feature value v not satisfying the relationship "element $v_j$<threshold value $t_j$" is tentatively assigned to "R" representing the child node 55B (in the case of "no" in FIG. 21) (hereinafter, this operation is referred to as a tentative assignment operation).

At that time, the learning unit 43C determines the division index of the feature value v in such a way that there is a decrease in the variability in the voting histogram 54. For example, the learning unit 43C determines the division index using Equation (8) given below.

$$G=\Sigma\{H(l)-HL\}^2+\Sigma\{H(r)-HR\}^2 \quad (8)$$

In Equation (8), H(l) represents the voting histograms 54 in which "S" representing the root node 55A is divided into "L" representing the child nodes 55B. Moreover, in Equation (8), H(r) represents the voting histograms 54 in which "S" representing the root node 55A is divided into "R" representing the child nodes 55B. Furthermore, in Equation (8), HL represents the average value of all pixel histograms H(l), and HR represents the average value of all pixel histograms H(r).

However, the method implemented by the learning unit 43C for determining the division index is not limited to Equation (8).

For each node, the learning unit 43C determines the division index in such a way that the variability of the voting histogram 54 is the smallest, and repeats the tentative assignment operation from the root node 55A to the leaf nodes 55C via the child nodes 55B. That is, for each node, the learning unit 43C determines, as the division index, a combination of the element $v_j$ and the threshold value $t_j$ in such a way that the value of G given in Equation (8) becomes the smallest; and repeats dividing the feature value v belonging to each node.

Then, the learning unit 43C determines, as the leaf nodes 55C present at the end, the nodes at the time of satisfying an end condition. Herein, the end condition is, for example, at least one of a first condition, a second condition, and a third condition. The first condition is that the number of feature values v included in the nodes is smaller than a predetermined number. The second condition is that the tree structure of the random tree 55 has a greater depth than a predetermined value. The third condition is that the value of the division index is smaller than a predetermined value.

By determining the leaf nodes 55C, the learning unit 43C learns the feature value v belonging to the leaf nodes 55C.

As described above, the learning unit 43C determines the division index of each node starting from the root node 55A to the leaf nodes 55C via the child nodes 55B, determines the feature values v belonging to the leaf nodes 55C; and learns the random tree 55. Moreover, the learning unit 43C performs the tentative assignment operation by varying the combination of division indexes, and learns a predetermined T number of random trees 55.

Herein, the T number of random trees 55 learnt by the learning unit 43C can be equal to one or can be an arbitrary number equal to or greater than two. Greater the number of random trees 55 learnt by the learning unit 43C from the image 33, the greater is the possibility that the first calculator 15 learns the random trees 55 that enable density calculation with accuracy in the image analysis system 10. Thus, it is desirable that the learning unit 43C learns a random forest representing a plurality of random trees 55.

Figure 22:
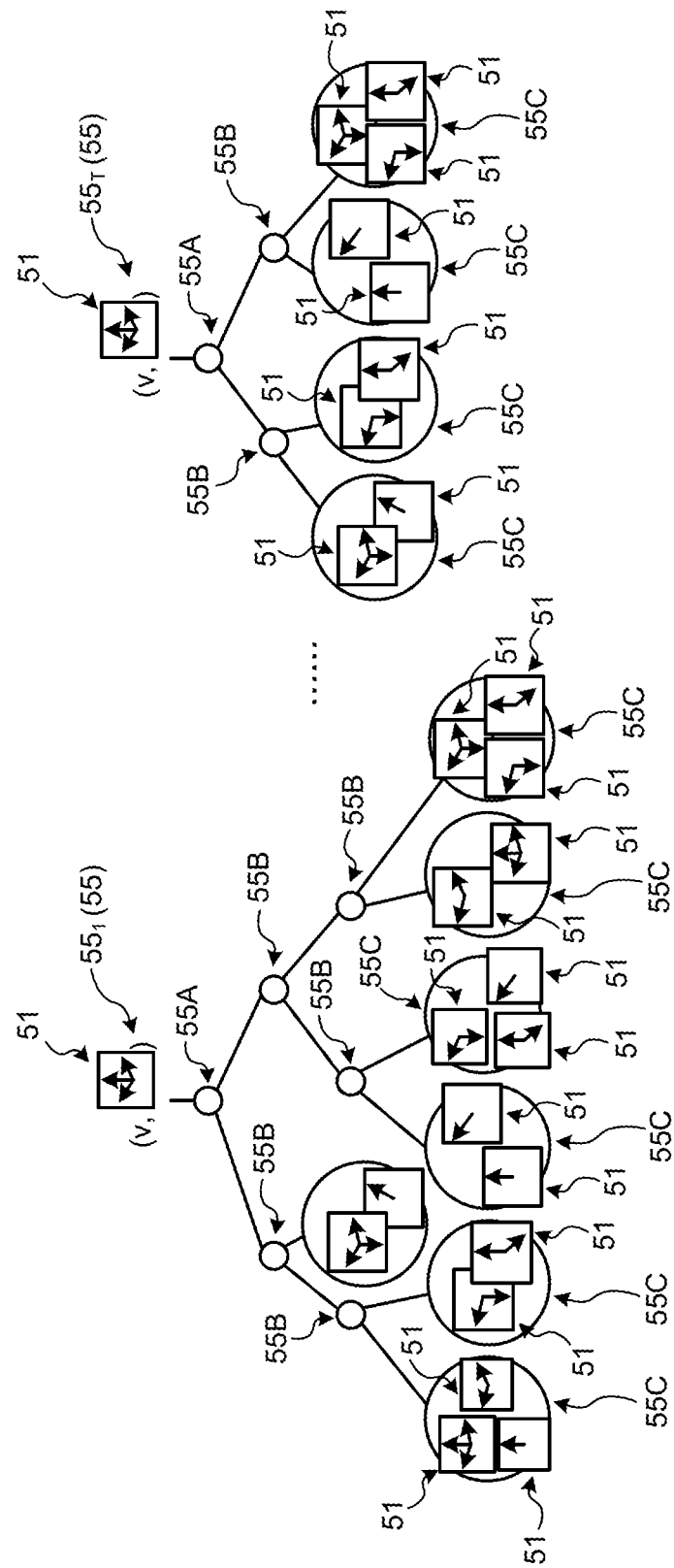
FIG. 22 is an explanatory view of a random forest.

FIG. 22 is an explanatory diagram for explaining a plurality of random trees 55 (i.e., a random forest) that is learnt. Each of a random tree $55_1$ to a random tree $55_T$ has a different division index for each node. Hence, for example, even if all feature values v that have the label 51 attached thereto and that are assigned to the root node 55A are same, there are times when the random tree $55_1$ to the random tree $55_T$ have different labeled feature values v belonging to the leaf nodes 55C. Meanwhile, in the example illustrated in FIG. 22, although only the labels 51 are illustrated for the leaf nodes 55C, it is actually the feature value v attached with the label 51 that belongs to each leaf node 55C.

Returning to the explanation with reference to FIG. 18, the first predicting unit 43D estimates the representative label for each cluster obtained by means of division by the learning unit 43C during the learning. The first predicting unit 43D estimates the representative label from the labels 51 attached to one or more feature values v belonging to the cluster.

As described above, in the second embodiment, a cluster implies the leaf node 55C that is a node at the end of the random tree 55. Hence, the first predicting unit 43D estimates the representative label of each leaf node 55C from the labels 51 attached to all feature values v belonging to the leaf node 55C.

Figure 23:
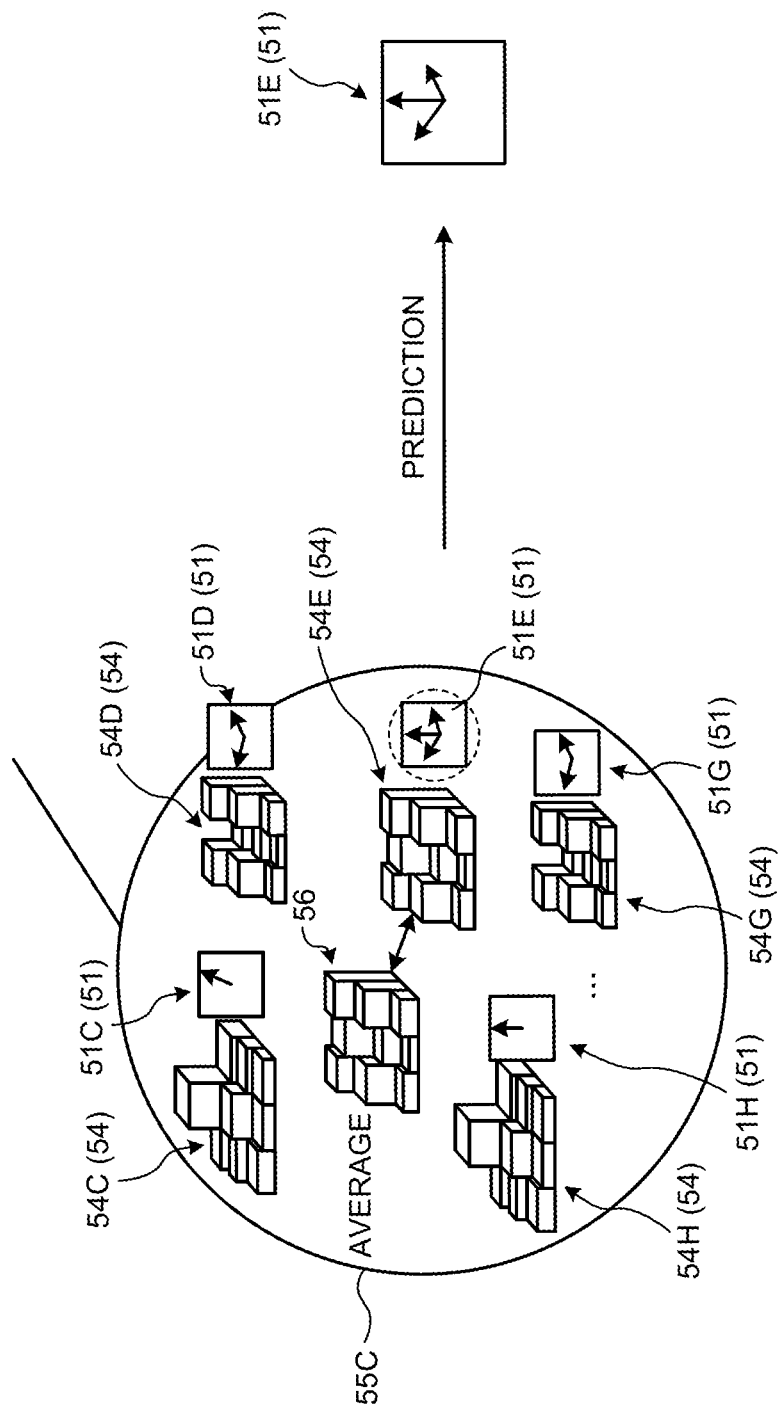
FIG. 23 is an explanatory view of prediction of a representative label.

FIG. 23 is an explanatory diagram for explaining the estimation of representative labels. With reference to FIG. 23, the explanation is given for an example of a single leaf node 55C. Firstly, the first predicting unit 43D reads the label 51 attached to each feature value v belonging to the leaf node 55C. In the example illustrated in FIG. 23, the first predicting unit 43D reads labels 51C, 51D, 51E, 51G, and 51H. Then, the first predicting unit 43D calculates an average histogram 56, which represents the average of the voting histograms 54 (54C, 54D, 54E, 54G, and 54H) corresponding to the labels 51C, 51D, 51E, 51G, and 51H.

Then, the first predicting unit 43D selects, from among the voting histograms 54 (54C, 54D, 54E, 54G, and 54H) belonging to the leaf node 55C, the voting histogram 54 that is close to the average histogram 56. Herein, it is desirable that the first predicting unit 43D selects, from among the voting histograms 54 (54C, 54D, 54E, 54G, and 54H) belonging to the leaf node 55C, the voting histogram 54 that is closest to the average histogram 56. In the example illustrated in FIG. 23, the first predicting unit 43D selects the voting histogram 54E that is closest to the average histogram 56. Then, the first predicting unit 43D estimates the label 51E, which is the label 51 corresponding to the voting histogram 54E, as the representative label of the leaf node 55C.

The first predicting unit 43D performs the same operation for all leaf nodes 55C in all random trees 55 learnt by the learning unit 43C, and thus estimates the representative label of each leaf node 55C.

Figure 24:
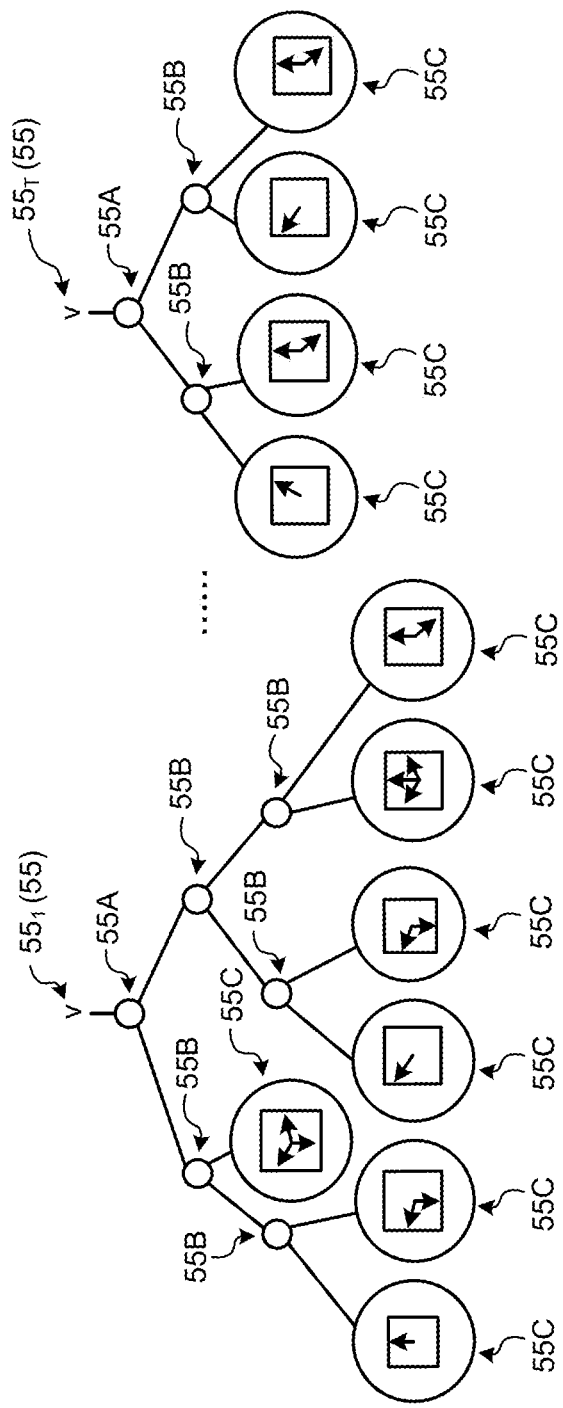
FIG. 24 is an explanatory view of the random trees after the prediction of the representative label.

FIG. 24 is an explanatory diagram for explaining the random trees 55 after the representative labels are estimated. As illustrated in FIG. 24, when the first predicting unit 43D estimates the representative label for each leaf node 55C, the representative labels get estimated for all leaf nodes 55C in all random trees 55 (the random trees $55_1$ to $55_T$) included in the random forest that is learnt by the learning unit 43C.

As a result of performing the operations described above, the arithmetic processor 43 calculates the regression models and the representative labels.

Returning to the explanation with reference to FIG. 16, the second predicting unit 44 obtains the random trees 55, which are calculated as regression models by the arithmetic processor 43, and the representative labels of the leaf nodes 55C. Then, the second predicting unit 44 substitutes the feature values, which are calculated from the partial regions 50, in the parameters of the random trees 55 obtained by the arithmetic processor 43. With that, the second predicting unit 44 estimates the representative label corresponding to each partial region 50.

Herein, if the arithmetic processor 43 obtains only a single random tree 55, the second predicting unit 44 estimates a single representative label for each partial region 50 using the single random tree 55. On the other hand, if the arithmetic processor 43 obtains a plurality of random trees 55 (i.e., obtains a random forest), then the second predicting unit 44 obtains, for each partial region 50, a plurality of representative labels corresponding to the random trees 55 and estimates one of those representative labels as the representative label to be used in density measurement.

Figure 25:
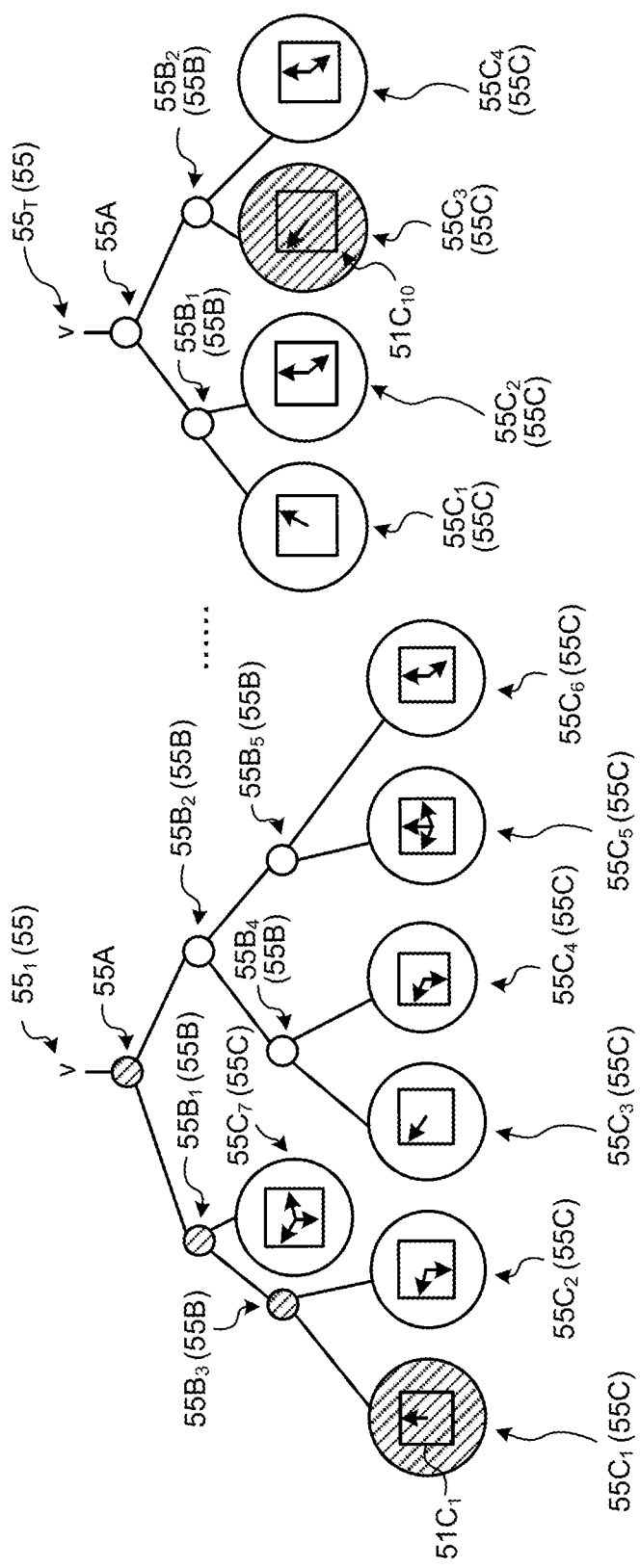
FIG. 25 is another explanatory view of the prediction of the representative label.

FIG. 25 is an explanatory diagram for explaining representative label estimation performed by the second predicting unit 44. Herein, it is assumed that the arithmetic processor 43 obtains the random trees 55 (the random trees $55_1$ to $55_T$) and the representative labels as illustrated in FIG. 25.

In that case, the second predicting unit 44 substitutes the feature value of a partial region in the root node 55A of each random tree 55 (each of the random trees $55_1$ to $55_T$). Then, along the division index determined for each node of each random tree 55 (each of the random trees $55_1$ to $55_T$), the second predicting unit 44 comes down the tree structure from the root node 55A to the leaf nodes 55C via the child nodes 55B. Then, the second predicting unit reads the representative labels belonging to the leaf nodes 55C.

As a result, the second predicting unit 44 obtains a plurality of representative labels for each random tree 55 (each of the random trees $55_1$ to $55_T$) as the representative labels corresponding to the feature value of a single partial region 50.

For example, assume that a feature value $v_1$ of a particular partial region 50 is substituted as the variable of the random tree $55_1$ in the root node 55A. Moreover, assume that a leaf node $55C_1$ from among leaf nodes $55C_1$ to $55C_7$ is reached via child nodes $55B_1$ and $55B_3$ from among child nodes $55B_1$ to $55B_5$. In that case, the feature value $v_1$ has a label $51C_1$ as the representative label determined by the random tree $55_1$.

Furthermore, assume that the feature value $v_1$ is substituted as the variable of the random tree $55_T$ in the root node 55A. Moreover, assume that the leaf node $55C_3$ from among the leaf nodes $55C_1$ to $55C_4$ is reached via the child node $55B_2$ from among the child nodes $55B_1$ and $55B_2$. In that case, the feature value $v_1$ has a label $51C_1$ as the representative label determined by the random tree $55_T$.

Then, from among the representative labels obtained for each random tree 55 (each of the random trees $55_1$ to $55_T$), the second predicting unit 44 estimates the representative label to be used in density calculation. Herein, the second predicting unit 44 estimates the representative label to be used in density calculation in an identical manner to the first predicting unit 43D.

That is, the second predicting unit 44 calculates an average histogram of the voting histograms 54 corresponding to the representative labels obtained for each random tree 55 (each of the random trees $55_1$ to $55_T$). Then, from among the representative labels obtained for each random tree 55 (each of the random trees $55_1$ to $55_T$), the second predicting unit 44 estimates, as the representative label to be used in density measurement, the representative label corresponding to the voting histogram 54 that is closest to the average histogram.

Returning to the explanation with reference to FIG. 16, the density calculation unit 45 calculates the average density of the objects captured in the image 33. The density calculation unit 45 calculates the average density of the objects based on the relative positions of the objects indicated by the representative labels that correspond to each partial region and that are estimated by the second predicting unit 44.

The density calculation unit 45 includes a second calculation unit 45A, a third calculation unit 45B, and a fourth calculation unit 45C.

The second calculation unit 45A calculates, based on the relative positions of the objects indicated by the representative labels corresponding to each of multiple partial regions, the density distribution of the objects in each partial region. The second calculation unit 45A stores therein in advance the first positions used by the arithmetic processor 43. Meanwhile, herein, the representative labels imply the representative labels to be used in density measurement.

For example, the second calculation unit 45A uses a probability density function N( ) of a normalization distribution and calculates a density distribution $D_i(x)$ of the objects captured in a partial region.

$$D_i(x) = \Sigma N(x; l_j, \sigma) \quad (9)$$

In Equation (9), x represents an arbitrary position in the partial region 50. Moreover, in Equation (9), $l_j$ represents the estimated relative position of the object. Furthermore, in Equation (9), σ represents dispersion.

The third calculation unit 45B arranges, at the position corresponding to each of the multiple partial regions 50 set in the image 33, the density distribution of the partial region 50. Herein, arranging the density distribution implies attaching the density distribution of each partial region 50, which is set in the image 33, at the position corresponding to the corresponding partial region 50.

Meanwhile, there are times when the multiple partial regions 50 set in the image 33 has at least some mutually overlapping portion. Hence, when the density distributions of the partial regions 50, which are set in the image 33, are arranged in the image 33, there are times when the density distributions corresponding to the partial regions 50 have at least some mutually overlapping portion.

In that regard, according to the frequency of overlapping of the density distributions in the correction image 33, the fourth calculation unit 45C calculates a first average value of the densities of the objects for each pixel constituting the correction image 33.

The fourth calculation unit 45C calculates, for each partial region 50 in the image 33, an average value of the first average values in the pixels included in the partial region 50. Specifically, the fourth calculation unit 45C uses, as the density of the objects in the partial region 50, a value obtained by dividing a sum (a result of the addition) of the first average values in the pixels included in the partial region 50 by the number of pixels included in the partial region 50.

As a result, the second calculator 16 calculates the density of the objects for each of the partial regions 50 included in the image 33.

Figure 26:
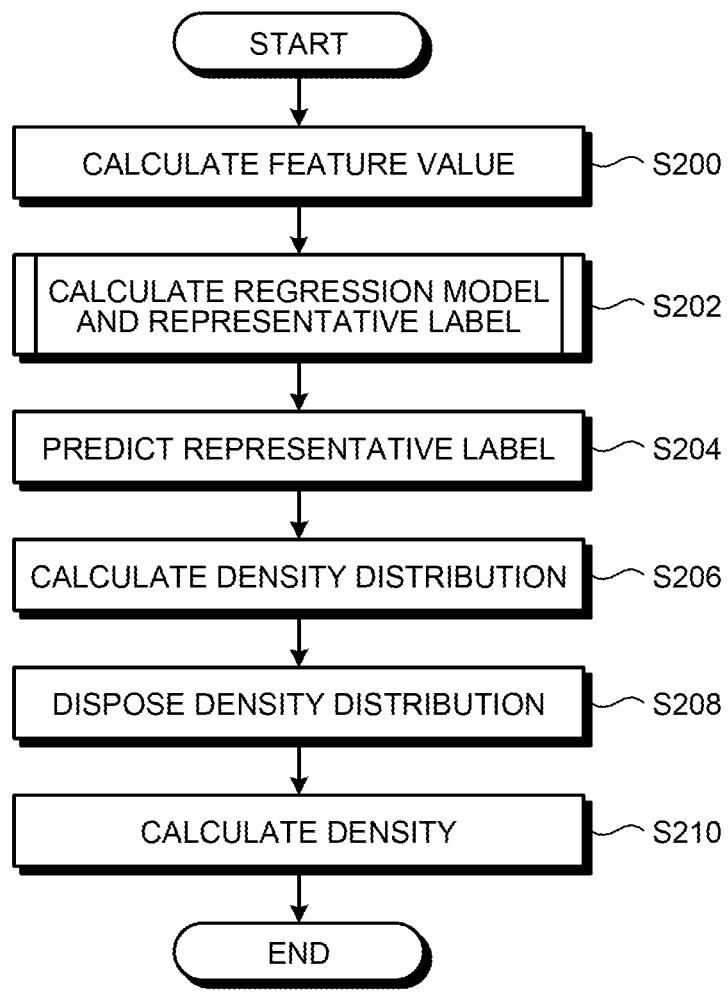
FIG. 26 is a flowchart illustrating a procedure of density calculation processing.

Given below is the explanation of a sequence of operations performed during the density calculation operation by the second calculator 16. FIG. 26 is a flowchart for explaining a sequence of operations performed during the density calculation operation by the second calculator 16.

The second calculator 16 calculates the feature value for each of the multiple partial regions 50 set by the set unit 14 (refer to FIG. 1) from the image 33 (step S200).

Then, the arithmetic processor 43 calculates the random trees 55 as regression models and calculates representative labels (Step S202) (details given later).

Subsequently, the second predicting unit 44 substitutes the calculated feature values in the parameters of the random trees 55 obtained by the arithmetic processor 43. With that, the second predicting unit 44 estimates the representative label corresponding to each partial region 50 (Step S204).

Then, the second calculation unit 45A calculates, based on the relative positions of the objects indicated by the representative labels, the density distribution of the objects in each partial region 50 (Step S206).

The third calculation unit 45B provides the calculated density distribution of the partial region 50 to the position corresponding to the partial region 50 in the image 33 for each partial region 50 (step S208). The fourth calculation unit 45C calculates the density of the objects for each partial region 50 included in the image 33 in accordance with the frequency of overlap of the density distributions in the image 33 (step S210). Then, this routine ends.

Figure 27:
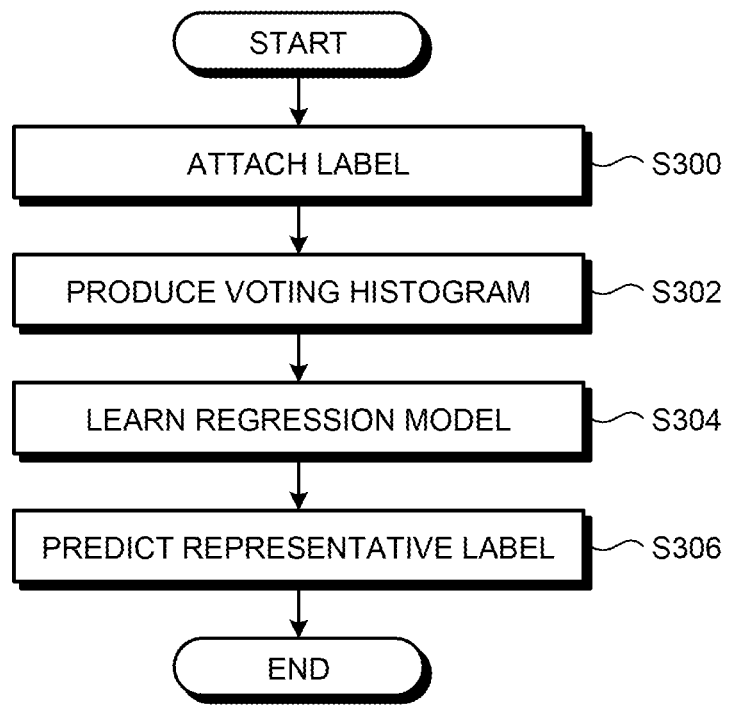
FIG. 27 is a flowchart illustrating a procedure of arithmetic operation processing.

Given below is the explanation of the arithmetic processing performed by the arithmetic processor 43 at Step S202 illustrated in FIG. 26. FIG. 27 is a flowchart for explaining a sequence of operations performed during the arithmetic processing by the arithmetic processor 43.

Firstly, the searching unit 43A of the arithmetic processor 43 attaches a label to the feature value of each of the multiple partial regions 50 calculated at Step S200 (see FIG. 26) (Step S300). The voting unit 43B calculates the histogram 52 from the labels 51, and votes the histogram 52 into the parametric space 53 to generate the voting histogram 54 (Step S302).

Then, the learning unit 43C learns regression models that represent the relationship between the feature values of the partial regions 50 and the relative positions of the objects captured in those partial regions 50 (Step S304). In the second embodiment, as described above, the learning unit 43C learns the random trees 55 as the regression models.

Then, the first predicting unit 43D estimates a representative label for each cluster (each leaf node 55C) that is obtained by means of division by the learning unit 43C during the learning (Step S306).

Subsequently, in the arithmetic processor 43, the random trees 55 learnt as regression models and the representative labels of the clusters (the leaf nodes 55C) are output to the second predicting unit 44. It marks the end of the present routine.

As described above, the searching unit 43A of the second calculator 16 in the present embodiment searches for the objects captured in each of the partial regions 50 set in the image 33. The searching unit 43A generates, as the label, a vector representing the relative positions between the predetermined first position in the partial region 50 and all of the objects captured in the partial region 50, and attached the label to the feature value of the partial region 50. The learning unit 43C allocates the labeled feature value to each node to determine a division index of each node. As a result, the learning unit 43C learns the regression models. The first predicting unit 43D predicts the representative label for each leaf node 55C of the regression models.

A label represents a vector indicating the relative positions of the objects, and has a small data size. For that reason, it becomes possible to reduce the volume of data required in configuring the regression models. Thus, as a result of performing density calculation using the regression models according to the second embodiment, the image analysis system 10 not only can achieve the effect of the first embodiment but also can achieve density calculation for objects using a low amount of memory.

The second calculator 16 learns the regression models without directly detecting the objects from the image 33. The second calculator 16 in the present embodiment can learn the regression models that allow performing the density calculation with high accuracy without reduction in measurement accuracy even when the objects are small and overlap with one another in the image 33.

The second calculator 16 of the image analysis system 10 in the present embodiment performs the processing described in the present embodiment, thereby making it possible to calculate the density of the objects with high accuracy and low memory capacity in addition to the effects of the first embodiment.

In the second embodiment, the explanation is given for a case in which a random forest is used as the regression models. However, the regression models learnt by the second calculator 16 are not limited to a random forest. Alternatively, for example, the second calculator 16 can use a nearest neighbor classifier as the regression model.

Figure 28:
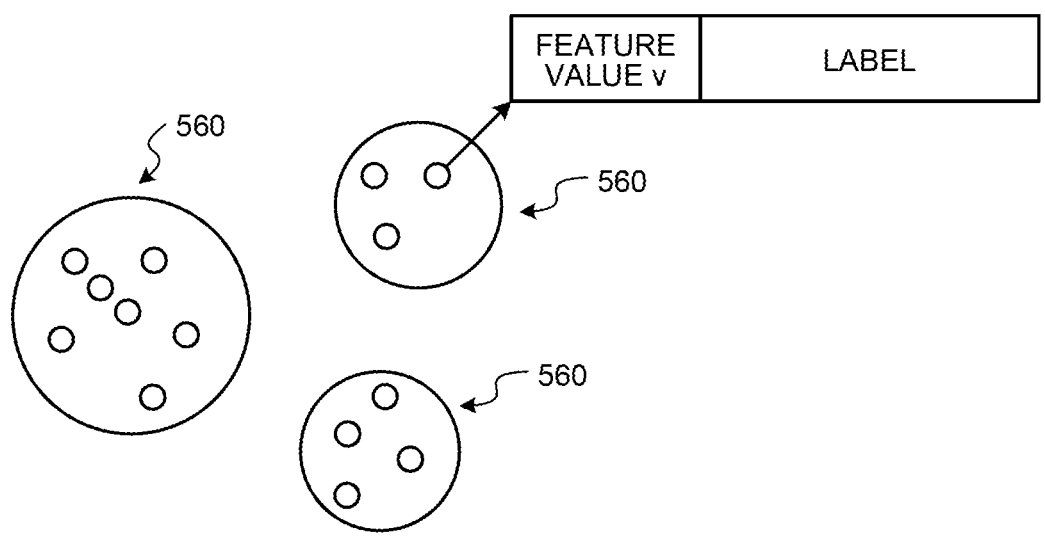
FIG. 28 is an explanatory view of learning using a nearest neighbor discriminator.

FIG. 28 is an explanatory diagram for explaining the learning using a nearest neighbor classifier. The learning unit 43C (see FIG. 18) divides the feature value v, which corresponds to each of the multiple partial regions 50 and which has the label 51 attached thereto, in a plurality of clusters 560 in such a way that there is a decrease in the variability in the corresponding voting histograms. Through this division, the learning unit 43C can learn the regression model.

More particularly, the learning unit 43C divides the feature value v, which corresponds to each of the multiple partial regions 50 and which has the label 51 attached thereto, into k number of clusters 56 by implementing a vector quantization method such as k-means.

Specifically, the learning unit 43C randomly allocates the clusters 56 to any labels 51 and calculates the average value for each cluster 56. The learning unit 43C, then, obtains the distance between each label 51 and the average value of each cluster 56. The learning unit 43C reallocates each label 51 to the cluster 56 having the closet average value. When the allocation of all of the labels 51 to the clusters 56 is not changed in the processing described above, the processing ends. Otherwise, the processing is repeated.

As a result, the feature values v having the labels 51 attached thereto are divided into the clusters 56 on the basis of groups of similar feature values v.

The first predicting unit 43D calculates the average value of the labels 51 that are attached to the feature values v belonging to each cluster 56. Then, from among the labels 51 attached to the feature values v belonging to each cluster 56, the first predicting unit 43D estimates the label 51 that is closest to the calculated average value as the representative label.

Moreover, the second calculator 16 obtains a nearest neighbor classifier as the regression model. In that case, the second predicting unit 44 uses the nearest neighbor classifier to match the feature value calculated from a partial region and the estimated representative vector of each cluster, and selects the representative vector having the shortest distance to the feature value calculated from the partial region. Then, from the set of labels 51 attached to the feature values belonging to the cluster to which the selected representative vector belongs, the second predicting unit 44 can estimate the representative label corresponding to each partial region in an identical manner to the first predicting unit 43D.

Figure 29:
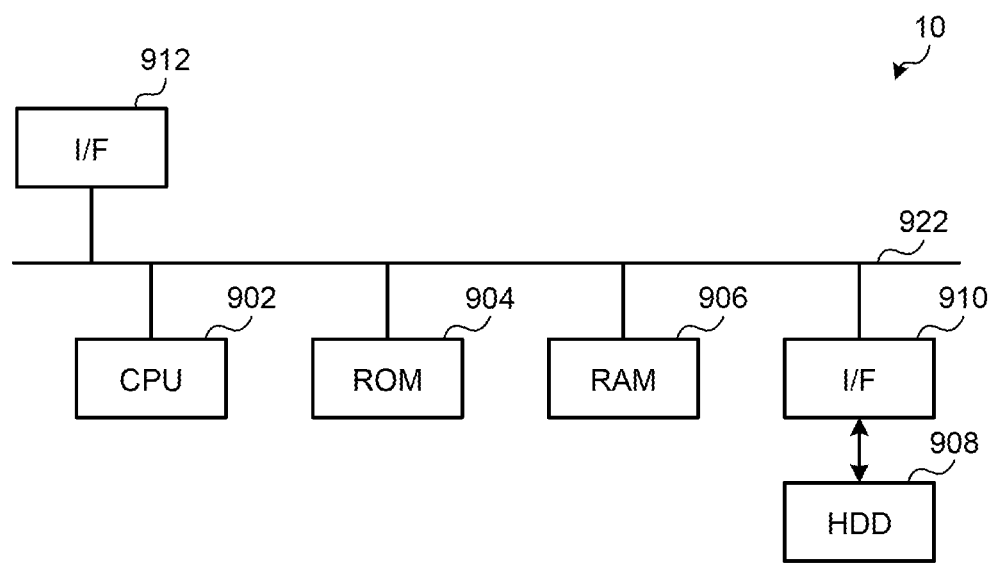
FIG. 29 is a block diagram illustrating an exemplary hardware structure.

FIG. 29 is a block diagram illustrating an exemplary hardware configuration of the image analysis system 10 according to the embodiments and the modification example described above. As illustrated in FIG. 29, the image analysis system 10 according to the embodiments and the modification example described above has the hardware computer of a general-purpose computer that includes a central processing unit (CPU) 902, a random access memory (RAM) 906, a read only memory (ROM) 904 used for storing computer programs, a hard disk drive (HDD) 908, an interface (I/F) 910 serving as the interface with the HDD 908, an I/F 912 for image input-output purposes, and a bus 922. The CPU 902, the ROM 904, the RAM 906, the I/F 910, and the I/F 912 are connected to each other via the bus 922.

In the image analysis system 10 according to the embodiments and the modification example described above, the CPU 902 reads computer programs from the ROM 904 into the RAM 906, and executes them so that the constituent elements are implemented in the computer.

The computer programs that are executed to implement the operations performed in the image analysis system 10 according to the embodiments described above can be stored in the HDD 908. Alternatively, the computer programs that are executed to implement the operations performed in the image analysis system 10 according to the embodiments described above can be stored in advance in the ROM 904.

Still alternatively, the computer programs that are executed to implement the operations performed in the image analysis system 10 according to the embodiments described above can be stored and provided as a computer program product in a computer-readable memory medium such as a compact disk read only memory (CD-ROM), a compact disk readable (CD-R), a memory card, a digital versatile disk (DVD), and a flexible disk (FD) in an installable or executable file. Still alternatively, the computer programs that are executed to implement the operations performed in the image analysis system 10 according to the embodiments described above can be saved on a computer connected to a network such as the Internet and can be made available for download through the network. Still alternatively, the computer programs that are executed to implement the operations performed in the image analysis system 10 according to the embodiments described above can be provided or distributed through a network such as the Internet.

For example, unless contrary to the nature thereof, the processes of the flowcharts according to the embodiments described above can have a different execution sequence, can be executed in plurality at the same time, or can be executed in a different sequence.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image analyzing apparatus comprising:
   at least one memory having computer executable components stored therein; and
   at least one processor communicatively coupled to the memory, wherein the processor is configured by the executable components to:
   set multiple partial regions in an image;
   calculate an optical flow in a partial region;
   calculate a density of an object included in the partial region;
   divide the image into multiple blocks;
   calculate, for a block, a statistical amount that is derived from the density and a moving amount of the object for the partial region included in the block, the moving amount being derived from the optical flow, the statistical amount being one of or a combination of two or more of kinetic momentum of, kinetic energy of, an accumulation degree of, and potential energy of the object; and
   specify, out of the blocks, an unsteady block that is in an unsteady state on the basis of the statistical amount.

2. The apparatus according to claim 1, wherein the processing circuitry specifies the unsteady block that has the statistical amount equal to or larger than a threshold.

3. The apparatus according to claim 2, wherein the processing circuitry
   calculates, for the block, as the statistical amount representing the kinetic momentum of the object, a sum of multiplication values obtained by multiplying the density by the moving amount for the partial region included in the block, and
   specifies, out of the blocks, a block that has the statistical amount equal to or larger than a first threshold to be the unsteady block that has the statistical amount equal to or larger than the threshold.

4. The apparatus according to claim 2, wherein the processing circuitry
   calculates, for the block, as the statistical amount representing the kinetic energy of the object, a sum of multiplication values obtained by multiplying the density by the square of the moving amount for the partial region included in the block, and
   specifies, out of the blocks, a block that has the statistical amount equal to or larger than a second threshold to be the unsteady block that has the statistical amount equal to or larger than the threshold.

5. The apparatus according to claim 2, wherein the processing circuitry
   calculates, for the block, as the statistical amount representing the accumulation degree of objects, a sum of multiplication values obtained by multiplying the density by a reciprocal of the moving amount for the partial region included in the block, and specifies, out of the blocks, a block that has the statistical amount equal to or larger than a third threshold to be the unsteady block that has the statistical amount equal to or larger than the threshold.

6. The apparatus according to claim 2, wherein
the processing circuitry calculates, for the block, as the statistical amount representing the potential energy of the object, a sum of division values obtained by dividing a multiplication value by a distance, for each of the partial regions included in the block, the multiplication value being obtained by multiplying the density in the partial region, a reciprocal of the moving amount in the partial region, and the density in another partial region included in the block, the distance being from the partial region to the other partial region, and
specifies, out of the blocks, a block that has the statistical amount equal to or larger than a fourth threshold to be the unsteady block that has the statistical amount equal to or larger than the threshold.

7. The apparatus according to claim 1, wherein the unsteady state represents at least one of presence or absence of congestion of, presence or absence of accumulation of, and presence or absence of aggregation of objects included in the block.

8. The apparatus according to claim 1, further comprising a display controller configured to control a display to display a display image in which the unsteady block is emphasized in the image.

9. The apparatus according to claim 1, further comprising a display controller configured to control a display to display a display image in which information is superimposed on the unsteady block in the image, the information being indicative of the unsteady state.

10. The apparatus according to claim 1, further comprising a display controller configured to control a display to display a display image representing the unsteady block.

11. An image apparatus comprising:
at least one memory having computer executable components stored therein; and
at least one processor communicatively coupled to the memory, wherein the processor is configured by the executable components to:
calculate, for a block included in an image, a statistical amount that is derived from a density and a moving amount of an object for a partial region included in the block, the moving amount being derived from an optical flow, the statistical amount being one of or a combination of two or more of kinetic momentum of, kinetic energy of, an accumulation degree of, and potential energy of the object; and
specify, out of multiple blocks, an unsteady block that is in an unsteady state on the basis of the statistical amount.

12. An image analysis method comprising:
setting multiple partial regions in an image;
calculating an optical flow in a partial region;
calculating a density of an object included in the partial region;
dividing the image into multiple blocks;
calculating, for a block, a statistical amount that is derived from the density and a moving amount of the object for the partial region included in the block, the moving amount being derived from the optical flow, the statistical amount being one of or a combination of two or more of kinetic momentum of, kinetic energy of, an accumulation degree of, and potential energy of the object; and
specifying, out of the blocks, an unsteady block that is in an unsteady state on the basis of the statistical amount.

13. An image analysis system, comprising:
the processing circuitry according to claim 1; and
a display configured to display a display image in which the unsteady block is emphasized in the image.

14. An image analyzing apparatus comprising:
at least one memory having computer executable components stored therein; and
at least one processor communicatively coupled to the memory, wherein the processor is configured by the executable components to perform:
setting multiple partial regions in an image;
calculating an optical flow in a partial region;
calculating a density of an object included in the partial region;
dividing the image into multiple blocks;
calculating, for a block, a statistical amount that is derived from the density and a moving amount of the object for the partial region included in the block, the moving amount being derived from the optical flow, the statistical amount being one of or a combination of two or more of kinetic momentum of, kinetic energy of, an accumulation degree of, and potential energy of the object; and
specifying, out of the blocks, an unsteady block that is in an unsteady state on the basis of the statistical amount.

* * * * *